US011333506B2

(12) United States Patent
Yu et al.

(10) Patent No.: US 11,333,506 B2
(45) Date of Patent: May 17, 2022

(54) COMPUTER-VISION BASED POSITIONING FOR AUGMENTED REALITY NAVIGATION

(71) Applicant: Phiar Technologies, Inc., Redwood City, CA (US)

(72) Inventors: Chen-Ping Yu, Santa Clara, CA (US); Xinyu Li, Newport, NJ (US); Jim Zin, San Francisco, CA (US); Aaditya Chandrasekhar, San Francisco, CA (US)

(73) Assignee: Phiar Technologies, Inc., Redwood City, CA (US)

( * ) Notice: Subject to any disclaimer, the term of this patent is extended or adjusted under 35 U.S.C. 154(b) by 0 days.

(21) Appl. No.: 17/127,789

(22) Filed: Dec. 18, 2020

(65) Prior Publication Data

US 2021/0148713 A1 May 20, 2021

Related U.S. Application Data

(63) Continuation of application No. 16/536,270, filed on Aug. 8, 2019, now Pat. No. 10,871,377.

(51) Int. Cl.
| | |
|---|---|
| *G01C 21/34* | (2006.01) |
| *G06T 19/00* | (2011.01) |
| *G01C 21/32* | (2006.01) |
| *G06T 7/73* | (2017.01) |
| *G06T 7/246* | (2017.01) |

(Continued)

(52) U.S. Cl.
CPC ............ *G01C 21/32* (2013.01); *G01C 21/34* (2013.01); *G01C 21/365* (2013.01); *G01C 21/3632* (2013.01); *G01C 21/3644* (2013.01); *G01C 21/3647* (2013.01); *G06T 7/248* (2017.01); *G06T 7/74* (2017.01); *G06T 19/003* (2013.01); *G06T 19/006* (2013.01); *G06V 20/20* (2022.01); *G06V 30/274* (2022.01); *G06T 2207/10016* (2013.01); *G06T 2207/30241* (2013.01)

(58) Field of Classification Search
CPC ...... G01C 21/34; G06T 19/006; G06T 19/003
See application file for complete search history.

(56) References Cited

U.S. PATENT DOCUMENTS

| | | |
|---|---|---|
| 2017/0090196 A1 | 3/2017 | Hendron |
| 2018/0209802 A1 | 7/2018 | Jung et al. |

(Continued)

OTHER PUBLICATIONS

Tory Smith, "Lining up AR features while weaving through traffic with the Vision SDK," Mapbox, Jul. 26, 2019. <https://blog.mapbox.com/lining-up-ar-features-while-weaving-through-traffic-with-the-vision-sdk-661c28363da4>.

(Continued)

*Primary Examiner* — Matthew Salvucci
(74) *Attorney, Agent, or Firm* — Cognition IP, P.C.; Edward Steakley

(57) ABSTRACT

Systems and methods for a more usable Augmented Reality (AR) display of navigation indications is described. A live camera image of a scene may be captured from a device. Navigation instructions may be generated from a navigation system and a navigation indication may be generated for display. A computer vision-based positioning algorithm may be performed on the camera image to determine the relative position between the viewpoint of the device and one or more landmarks in the live camera image. The location or shape of the visual display of the navigation indication may be determined based on the computer vision-based positioning algorithm.

20 Claims, 19 Drawing Sheets

(51) Int. Cl.
*G01C 21/36* (2006.01)
*G06V 20/20* (2022.01)
*G06V 30/262* (2022.01)

(56) References Cited

U.S. PATENT DOCUMENTS

2019/0137294 A1 5/2019 Jung et al.
2019/0226866 A1 7/2019 Chang
2019/0332866 A1 10/2019 Beall et al.

OTHER PUBLICATIONS

Malcom Owen, "Apple Maps may add AR view highlighting the route ahead while driving, "Apple Insider, Jul. 25, 2019 <https://appleinsider.com/articles/19/07/25/apple-maps-may-add-ar-view-highlighting-the-route-ahead-while-driving>.

COMPUTER-VISION BASED POSITIONING FOR AUGMENTED REALITY NAVIGATION

CROSS-REFERENCE TO RELATED APPLICATIONS

This application is a continuation of U.S. application Ser. No. 16/536,270, filed Aug. 8, 2019, which is hereby incorporated by reference in its entirety.

BACKGROUND

Embodiments herein relate generally to augmented reality (AR), and more specifically to AR navigation.

A variety of techniques exist for using AR to assist in navigation. For example, a route from a source point to a destination point may be generated by a navigation system, and the route may comprise a series of intermediate destination waypoints. An AR system may display the route. However, present AR systems display graphics that do not take into account the real landscape displayed on a screen. Instead, the AR graphics are painted on to the display without taking into account the actual environment. As a result, the AR graphics do not look integrated into the scene and appear fake. This results in a poor user experience. Therefore, there is a need for an AR assisted navigation system that provides for an improved user experience.

SUMMARY

A method, apparatus, and non-transitory computer readable medium for computer vision based positioning for Augmented Reality (AR) navigation are described. The method, apparatus, and non-transitory computer readable medium may provide for receiving a live camera image of a scene, obtaining navigation instructions from a navigation system, generating a navigation indication, performing a computer vision-based positioning algorithm, and displaying the scene with an augmented reality overlay with a visual display of the navigation indication, where the visual display of the navigation indication is determined by the computer vision-based positioning algorithm.

Another method, apparatus, and non-transitory computer readable medium for computer vision based positioning for AR navigation are described. The method, apparatus, and non-transitory computer readable medium may provide for receiving a live camera image of a scene, the live camera image captured by a device at a viewpoint, performing computer vision scene understanding on the live camera image, obtaining navigation instructions from a navigation system, generating a navigation indication from the navigation instructions, performing a computer vision-based positioning algorithm on the live camera image to determine the relative position between the viewpoint and one or more landmarks in the live camera image, and displaying the scene with an augmented reality overlay comprising a visual display of the navigation indication, wherein the location or shape of the visual display of the navigation indication is determined by the computer vision-based positioning algorithm.

Another method, apparatus, and non-transitory computer readable medium for computer vision based positioning for AR navigation are described. The method, apparatus, and non-transitory computer readable medium may provide for receiving a live camera image of a scene, the live camera image captured by a device at a viewpoint, scaling and transforming the live camera image for display on the device, reading, by the device, a current Global Positioning System (GPS) location, performing computer vision scene understanding on the live camera image to identify one or more semantic objects in the live camera image, obtaining navigation instructions from a navigation system, the navigation instructions generated by obtaining a route including a plurality of waypoints and performing local path planning, generating a route overlay and a point of interest from the navigation instructions, performing a computer vision-based positioning algorithm on the live camera image to determine the relative position between the viewpoint and one or more landmarks in the live camera image, and displaying the scene with an augmented reality overlay comprising a visual display of the route overlay and the point of interest, wherein the location or shape of the visual display of the route overlay and the point of interest are transformed based on the computer vision-based positioning algorithm.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
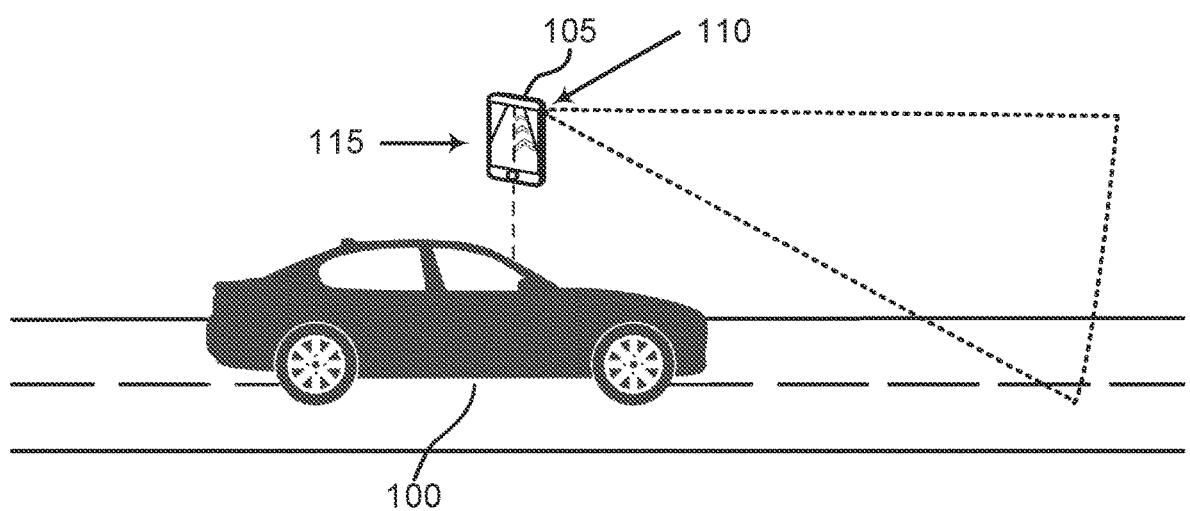
FIGS. 1A-1E show examples of a navigation system in accordance with aspects of the present disclosure.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A shows an example of a navigation system in accordance with aspects of the present disclosure. The example shown includes vehicle 100 and computing device 105. In some cases the computing device 105 is a separate mobile device. The computing device 105 may, for example, be mounted within the vehicle 100 such as on a dashboard or windshield or may be held by a user. The computing device 105 may include camera 110 and display 115. The camera 110 receives images of the roadway and the display 115 provides an augmented navigation view including an AR overlay. In certain embodiments, computing device 105 may be used without the vehicle 100.

In some embodiments, the computing device 105 is an integrated component of vehicle 100. The camera 110 may be integrated in the interior or exterior of vehicle 100 facing the road. The display 115 may be integrated in the interior or exterior of vehicle 100 facing the user. In some embodiments, the display 115 may be the vehicle windshield and graphics may be displayed in the windshield by an integrated electronic display, such as a liquid crystal display (LCD), or by projection on the windshield. In some embodiments, the display 115 may be a screen in the dashboard of the vehicle.

In some embodiments, the computing device 105 is an AR or virtual reality (VR) headset. The user may wear the computing device 105 and view an AR scene view a display 115 of the AR or VR headset. The display 115 may be, for example, an LCD or may be a projection on to the user's retina.

Figure 1B:
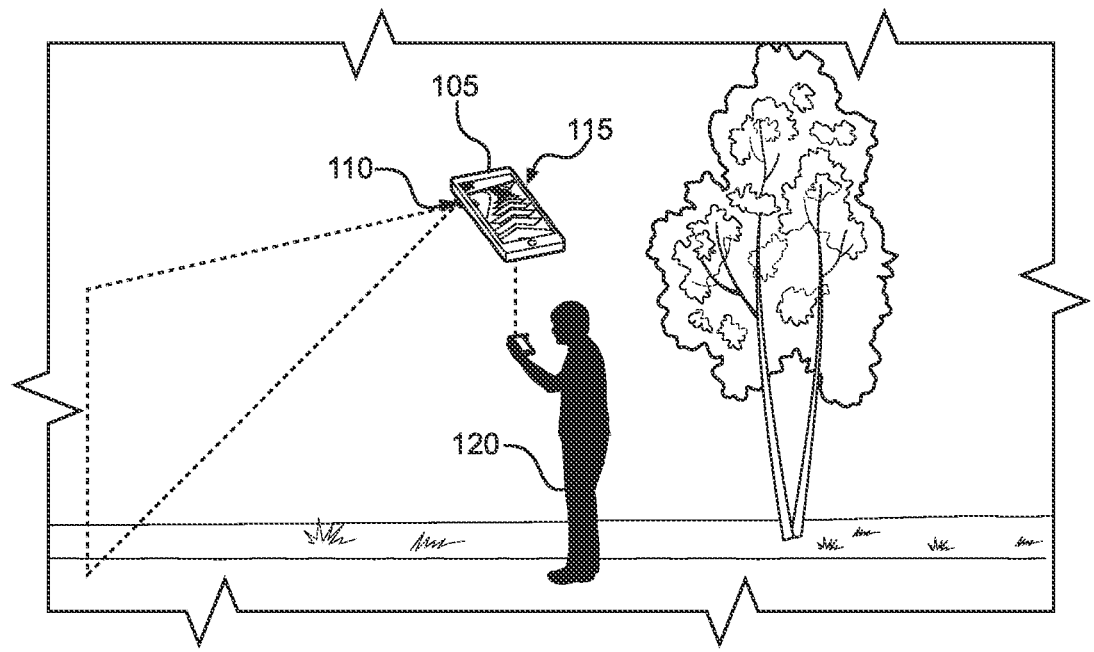
Figure 1B:
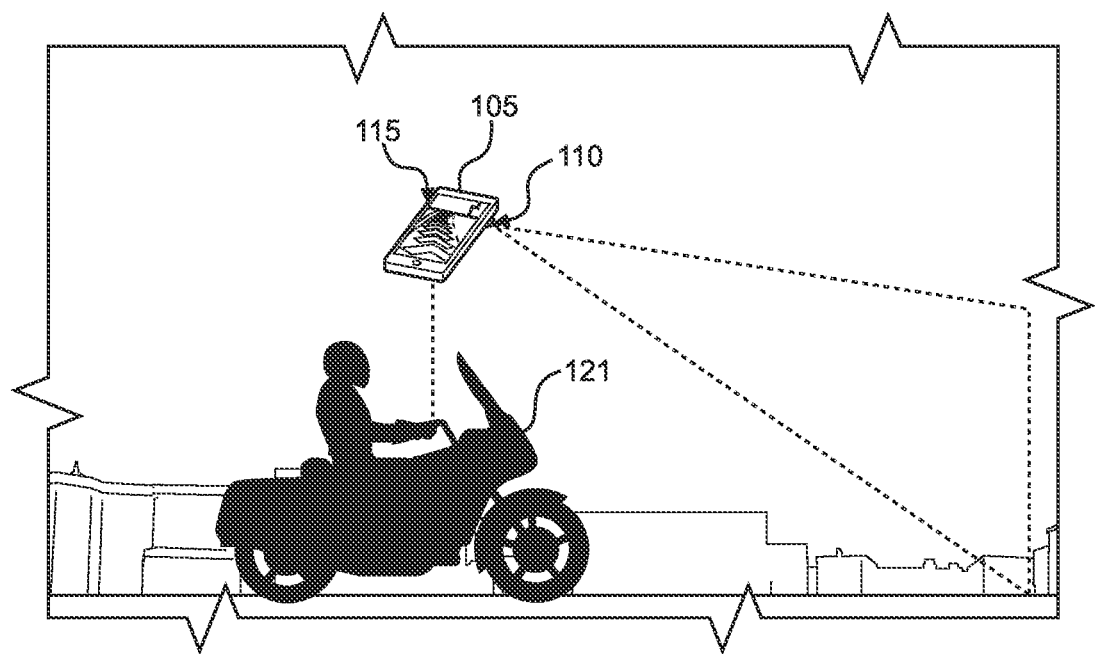
Figure 1C:
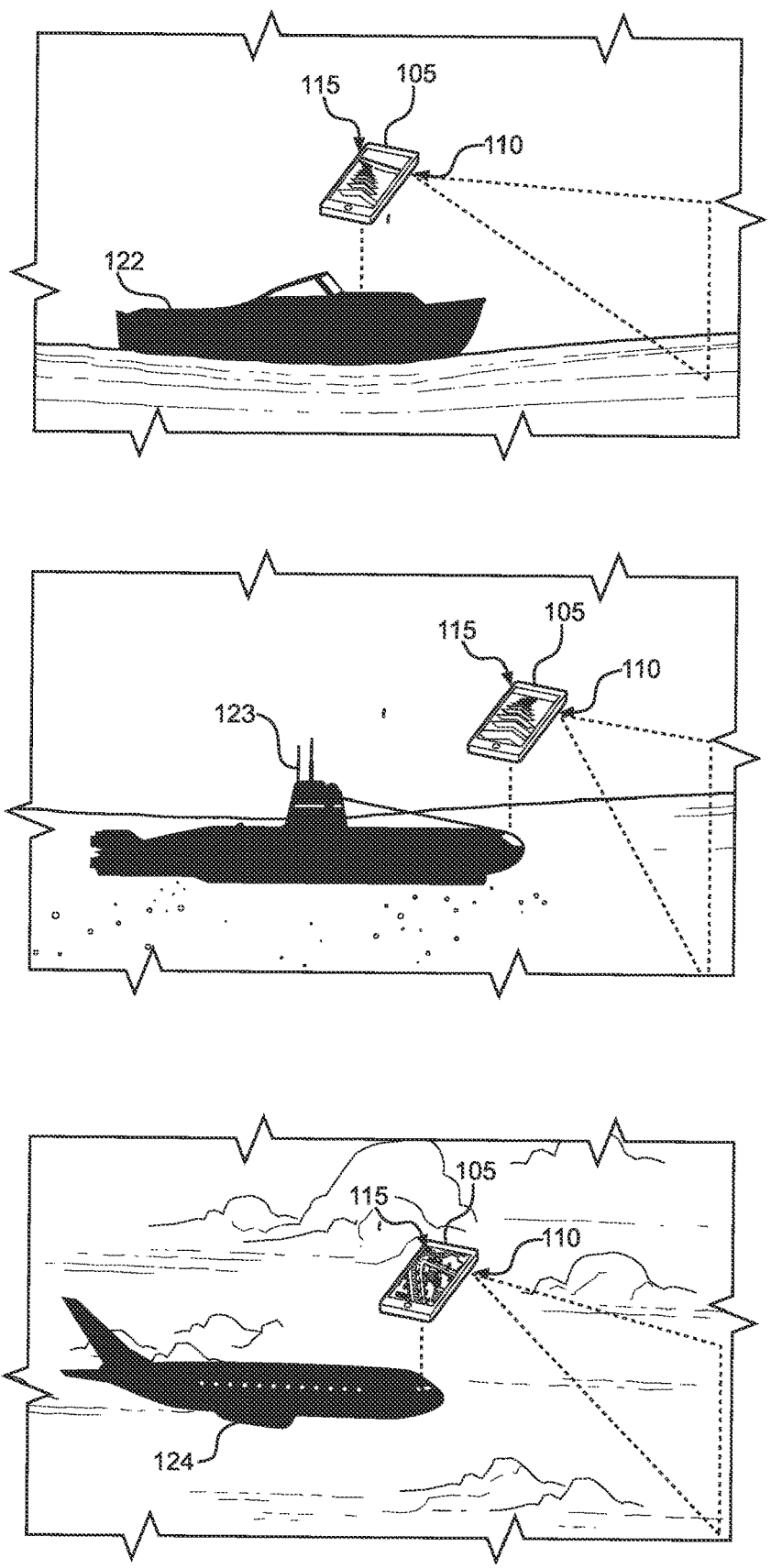

FIGS. 1B-1C illustrates additional form factors and environments where embodiments may be used. Person 120 may use computing device 105 for navigating while walking, such as on a sidewalk or path. Motorcycle 121 may include computing device 105 as a separate computing device or integrated component. In some embodiments, display 115 may be integrated into the motorcycle 121 windshield, for example. The computing device 105 may provide navigation directions to the motorcycle rider. Watercraft 122, such as a boat, may include computing device 105 as a separate computing device or integrated component. The computing device 105 may provide on water navigation directions to the user of the watercraft to navigate from one place to another. Underwater craft 123, such as a submarine, may include computing device 105 as a separate computing device or integrated component. The computing device 105 may provide underwater navigation directions to the user of the underwater craft 123 to navigate from one place to another. In some embodiments, computing device 105 may be used underwater by a scuba diver. For example, display 115 may be a component of a scuba diving mask and display navigation directions to the scuba diver by integrated components in the scuba diving mask or projection on the scuba diving mask within view of the user. Aircraft 124, such as an airplane or helicopter, may include computing device 105 as a separate computing device or integrated component. The computing device 105 may provide aerial navigation directions to the user of the aircraft 124 to navigate from one place to another, such as navigating between a source airport and a destination airport.

Figure 1D:
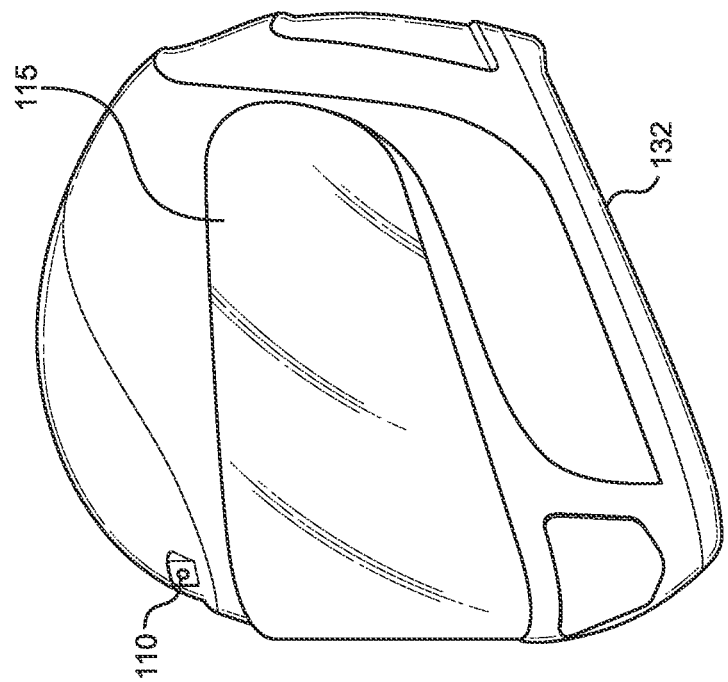
Figure 1D:
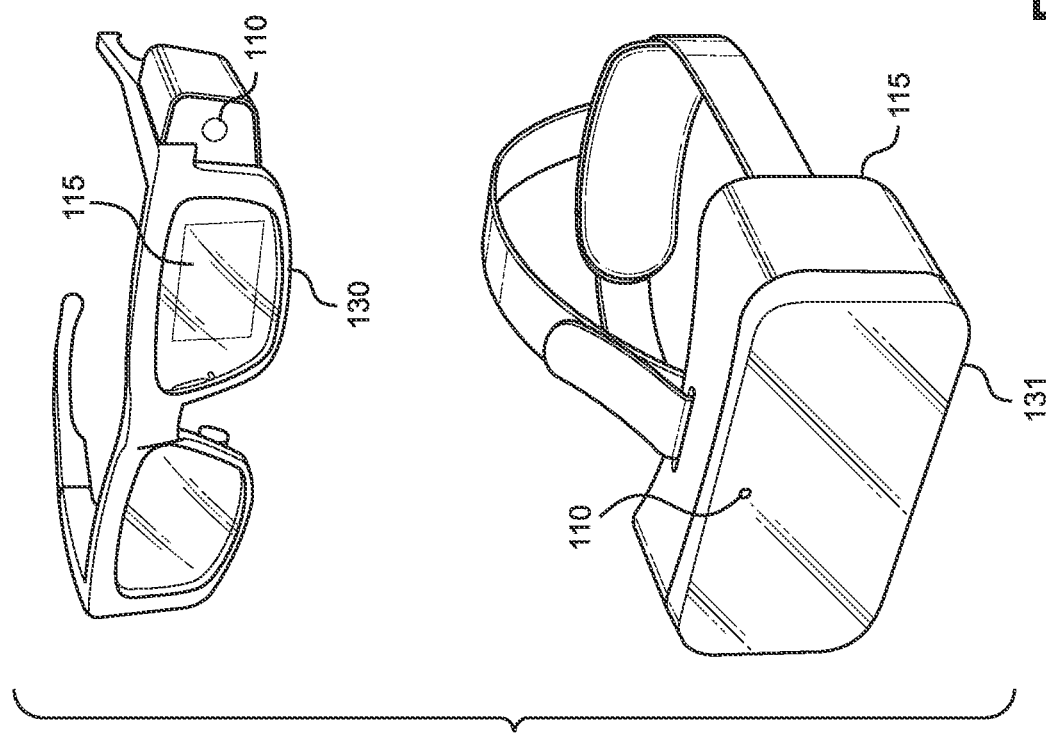

FIG. 1D illustrates additional head-mounted form factors where embodiments may be used. AR glasses 130 may comprise computing device 105 and include a camera 110 for capturing the scene and a display 115 for displaying the scene with AR components generated by computing device 105. The display 115 may be on the lenses of the glasses or in a separate display, such as an arm extending in front of the glasses. The lenses may include an embedded electronic screen, such as a transparent LCD, or may receive a projection from a projector. In other embodiments, the glasses may include a projector for projecting images directly on the user's eyes. Headset 131 may comprise computing device 105 and include a camera 110 for capturing the scene and a display 115 for displaying the scene with AR components generated by computing device 105. The display 115 may comprise a screen located near to the user's eyes for displaying video of the scene to create an immersive experience. The display may update in real-time with video from the camera 110. In other embodiments, the headset may include a projector for projecting images directly on the user's eyes. Helmet 132 may comprise computing device 105 and include a camera 110 for capturing the scene and a display 115 for displaying the scene with AR components generated by computing device 105. In an embodiment, the display may be in a visor of the helmet, such as an embedded display screen, or may be projected on the visor. In other embodiments, the display is integrated into helmet separately from the visor. In other embodiments, the helmet may include a projector for projecting images directly on the user's eyes. Any of the head-mounted form factors 130, 131, 132 may be used for displaying AR navigation indications with computer vision-based positioning as described herein.

Figure 1E:
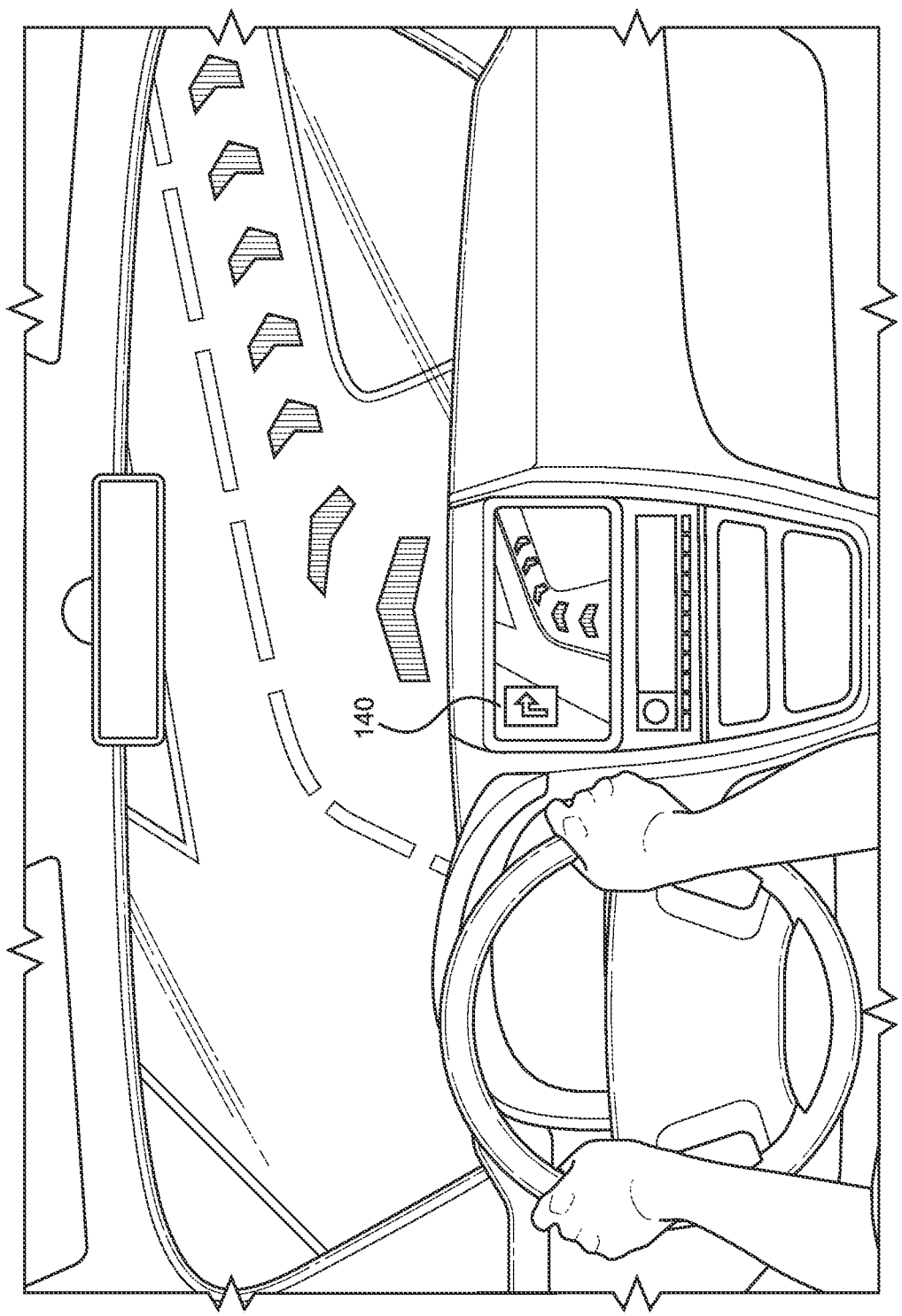

FIG. 1E illustrates an in-console navigation system 140 that includes a display for showing a current live view of the scene that may be captured from a camera. The camera may capture a view of the scene. The in-console navigation system may be located in a console or dashboard of a vehicle, such as a car, watercraft, underwater vehicle, aircraft, motorcycle, or other vehicle. The in-console navigation system 140 may be used for displaying AR navigation indications with computer vision-based positioning as described herein.

Some embodiments relate to the use of computer vision-based positioning techniques to provide an improved AR overlay on the display 115. Computer vision-based positioning techniques may include, for example, Visual Odometry (VO), Visual Inertial Odometry (VIO), and Simultaneous Localization and Mapping (SLAM). Computer vision-based positioning techniques may also include other methods of generating a 3D map of the environment based on an image or sequence of images. The use of these techniques, including VO, VIO, and SLAM, may allow determining the distance to landmarks in an image. In some embodiments, landmarks are pixel-level features, meaning that they comprise a small number of pixels, such as 2×2, 3×3, 4×4, 5×5, 6×6, and so on. The landmarks need not be square, but can be any shape. In some embodiments, by determining the distance to landmarks throughout the image a 3D map of the local environment map may be generated. In prior art AR systems, AR visual indicators would be displayed as floating in space. Without a computer vision-based positioning system, small margins of error in location services like GPS mean that the location determined by GPS is not entirely aligned with what is displayed on the screen (common GPS systems have an error of +/−3 meters or more). Therefore, displaying AR visual indicators based only on the navigation system will cause the AR visual indicators to not be fully aligned with the visual display on the live camera view. As a result, the AR visual indicators in prior art systems look like they are painted on the screen and are not integrated into the scene that is displayed visually.

To address this problem, the techniques herein allow for AR visual indicators to be incorporated into a real environment and appear as if they are integrated into the scene. The computer vision-based positioning system may generate a 3D map based on the live camera image displayed to the user. This enables tight integration between the visual display and the AR overlay. The computer vision-based positioning system may also be referred to as a visual positioning system.

For example, by generating a 3D map that includes the ground (such as a road surface, side walk, or path) a route overlay may be textured on to the 3D representation of the ground and displayed to the user as if it was really on the ground. Similarly, in some cases, it may be desirable to visually display a point of interest. The real-world distance to the point of interest may be determined from the navigation system, such as by GPS or other location services. The location may then be identified in the 3D map by identifying the location a corresponding distance from the viewpoint. The point of interest may then be displayed at this location in an AR display, so that the point of interest appears as if it is really in the scene. The route overlay and point of interest may be transformed based on the 3D map and then displayed as an overlay over the live camera image.

Computing device 105, camera 110, and display 115 may be an example of, or include aspects of, the corresponding element or elements described with reference to FIG. 2.

Figure 2:
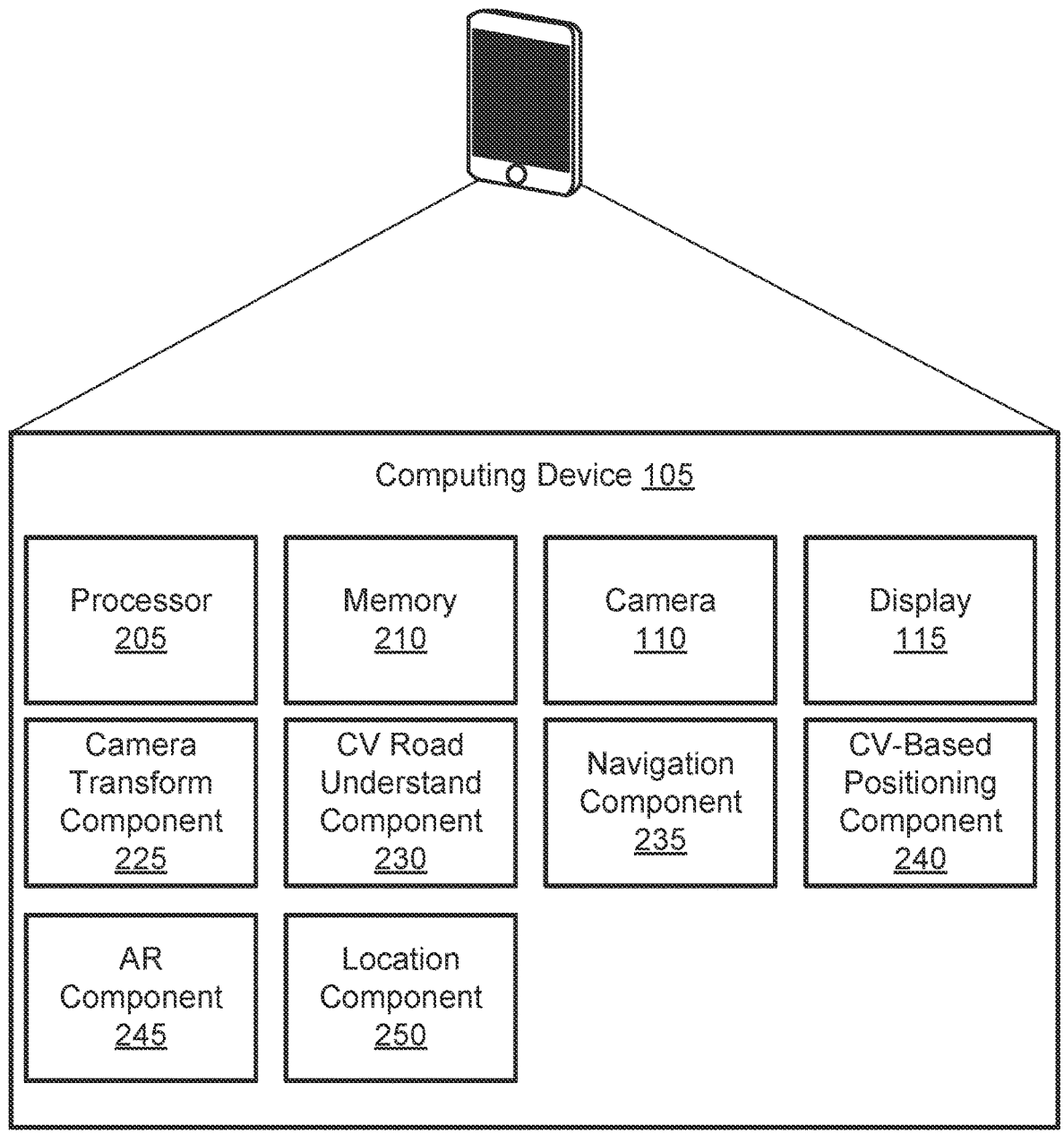
FIG. 2 shows an example of a computing device in accordance with aspects of the present disclosure.

FIG. 2 shows an example of a computing device 105 in accordance with aspects of the present disclosure. Computing device 105 may be an example of, or include aspects of, the corresponding element or elements described with reference to FIG. 1.

Computing device 105 may include processor 205, memory 210, camera 110, display 115, world-to-camera transform component 225, computer vision scene understanding component 230, navigation component 235, computer vision-based positioning component 240, Augmented Reality (AR) component 245, and location component 250.

The processor 205 may include a hardware device such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, a neural processing unit (NPU) (such as a dedicated microprocessor for processing neural networks), or any combination thereof. In some cases, the processor 205 may be configured to operate a memory array using a memory controller. In other cases, a memory controller may be integrated into processor. The processor 205 may be configured to execute computer-readable instructions stored in a memory to perform various functions.

The memory 210 may include random access memory (RAM), read-only memory (ROM), or a hard disk. The memory 210 may be solid state or a hard disk drive, and may store computer-readable, computer-executable software including instructions that, when executed, cause a processor to perform various functions described herein. In some cases, the memory 210 may contain, among other things, a BIOS which may control basic hardware or software operation such as the interaction with peripheral components or devices.

Camera 110 may capture images (e.g., images of a roadway or path). In an embodiment, the camera 110 is forward or side facing and captures a frontal or side view around the vehicle or user. Camera 110 may be an example of, or include aspects of, the corresponding element or elements described with reference to FIG. 1.

Display 115 may present images gathered by the camera 110 to a user along with an AR overlay. Display 115 may be an example of, or include aspects of, the corresponding element or elements described with reference to FIG. 1.

World-to-camera transform component 225 may receive a live camera image of a scene, where the live camera image is captured by a device at a viewpoint, such as using the camera 110. In some embodiments, world-to-camera transform component 225 may receive a sequence of images of the scene. World-to-camera transform component 225 may scale and transform the live camera image from camera 110 for display on the device via display 115.

Computer vision scene understanding component 230 may perform computer vision scene understanding on a camera image, such as the live camera image. In some embodiments, the computer vision scene understanding component 230 comprises one or more machine learning models for understanding the scene based on a camera image captured by camera 110. In some embodiments, the computer vision scene understanding component 230 includes lane detection, such as detecting the location of lanes based on an analysis of an image. The lanes may be detected based on lane markers such as painted lines or raised pavement markers. In some embodiments, the computer vision scene understanding component 230 includes sidewalk detection, such as detecting the location of a sidewalk based on an analysis of an image. The sidewalk may be detected based on pixel-level features of the sidewalk and other characteristics such as color and shape. In some embodiments, the computer vision scene understanding component 230 includes semantic object detection. Semantic object detection may comprise detecting objects in the image such as cars, vehicles, bicycles, pedestrians, stationary objects, signs, animals, plants and flora, and other objects. Semantic object detection may include identifying the location of the objects and classifying the objects to identify what they are. Moreover, semantic object detection may include semantic segmentation where each pixel of the camera image is classified to an object type, such as road, sidewalk, car, vehicle, background, and so on. In some embodiments, the computer vision scene understanding component 230 includes identifying a horizon line. By identifying the horizon line, the computer vision scene understanding component 230 may determine the segmentation between the ground (for example, including the road) and sky. This can help locate the ground and placing of a ground overlay on the ground so that the route overlay does not appear above the horizon. In some embodiments, this can help locate the road and placing of a road overlay on the road so that the route overlay does not appear above the horizon.

In some embodiments, the scene is a frontal view or side view of the scene and computer vision scene understanding component 230 performs its operations to understand a frontal or side view of the scene. In such an embodiment, the computer vision scene understanding component 230 may be referred to as a computer vision frontal view understanding component. The scene understanding may be referred to as frontal view understanding. Similarly, computer vision side view understanding component may perform side view understanding to understand the side view of a scene.

In some examples, the computer vision scene understanding component 230 may incorporate a machine learning model such as a neural network (NN). A NN may be a hardware or a software component that includes a number of connected nodes (e.g., artificial neurons). Each connection, or edge, may transmit a signal from one node to another. When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

Navigation component 235 may obtain navigation instructions from a navigation system. In some cases, the navigation component generates a route from a starting point to a destination point. The route may comprise a series of waypoints along the route, where each waypoint may include a corresponding navigation instruction, such as turning left or right or continuing straight. The navigation system may obtain the vehicle's present location from location component 250. The route may be generated based on a map, which may include a plurality of roads, paths, or other routes. In some embodiments, the navigation component 235 may perform local path planning. Local path planning may be used to route the vehicle or user around objects in the local environment such as obstacles and vehicles. It may also be used to route the vehicle into certain lanes.

Computer Vision-based Positioning component 240 may perform a computer vision-based positioning algorithm on a camera image, such as the live camera image, to determine the position between the viewpoint and one or more landmarks in the live camera image. Based on the positions determined between the viewpoint and one or more landmarks, the Computer Vision-based Positioning component 240 may generate a map of a local environment around the device based on the computer vision-based positioning algorithm. In some embodiments, the Computer Vision-based Positioning component 240 uses VO, VIO, or SLAM.

In one embodiment, Computer Vision-based Positioning component 240 uses VO. Computer Vision-based Positioning component 240 may receive a sequence of images of the scene in front of or to the sides of the user and detect a set of features in one or more of the sequence of images. Computer Vision-based Positioning component 240 may match the set of features to one or more features of preceding or succeeding images in the sequence of images. Computer Vision-based Positioning component 240 may then estimate motion based on the feature matching. Computer Vision-based Positioning component 240 may then perform local optimization of the estimated motion. Computer Vision-based Positioning component 240 may determine the relative position between the viewpoint and the one or more landmarks based on the estimated motion.

In another embodiment, Computer Vision-based Positioning component 240 uses VIO. Computer Vision-based Positioning component 240 may perform the same steps as VO and also read data from an inertial measurement unit and use the data for estimating motion and performing local optimization of the estimated motion. Computer Vision-based Positioning component 240 may determine the relative position between the viewpoint and one or more landmarks based on the estimated motion.

In another embodiment, Computer Vision-based Positioning component 240 uses SLAM. Computer Vision-based Positioning component 240 may receive a sequence of images of the scene in front or to the sides of the user and extract, for each of a set of the images, one or more SLAM landmarks from the image. Computer Vision-based Positioning component 240 may associate each SLAM landmark with one or more corresponding SLAM landmarks in prior images in the sequence. Computer Vision-based Positioning component 240 may estimate a location of the viewpoint and store the estimated location. Computer Vision-based Positioning component 240 may update one or more stored estimated locations of the SLAM landmarks. Computer Vision-based Positioning component 240 may determine the relative position between the viewpoint and the SLAM landmarks. The SLAM landmarks may be one or more landmarks in the live camera image.

AR component 245 may display the live camera image, such as of a road scene or other frontal/side scene, with an augmented reality overlay, which may include a visual display of one or more navigation indications. In some embodiments, the location or shape of the visual display of the navigation indication is determined by the computer vision-based positioning algorithm. In some embodiments, the navigation indication is a route overlay that is displayed to appear on top of the ground (e.g., road, path, or sidewalk) or elsewhere in the image (such as above the ground or road, path, or sidewalk). In some embodiments, the navigation indication is a point of interest, such as a maneuver indicator. In addition to the navigation indication, the AR component 245 may also include additional overlays such as navigation instructions, informational dashboards, a speedometer, a minimap, and so on.

Location component 250 may read a current position of the computing device 200. In some examples, the location component 250 may read a Global Positioning System (GPS) location or Global Navigation Satellite System (GNSS) location.

Figure 3:
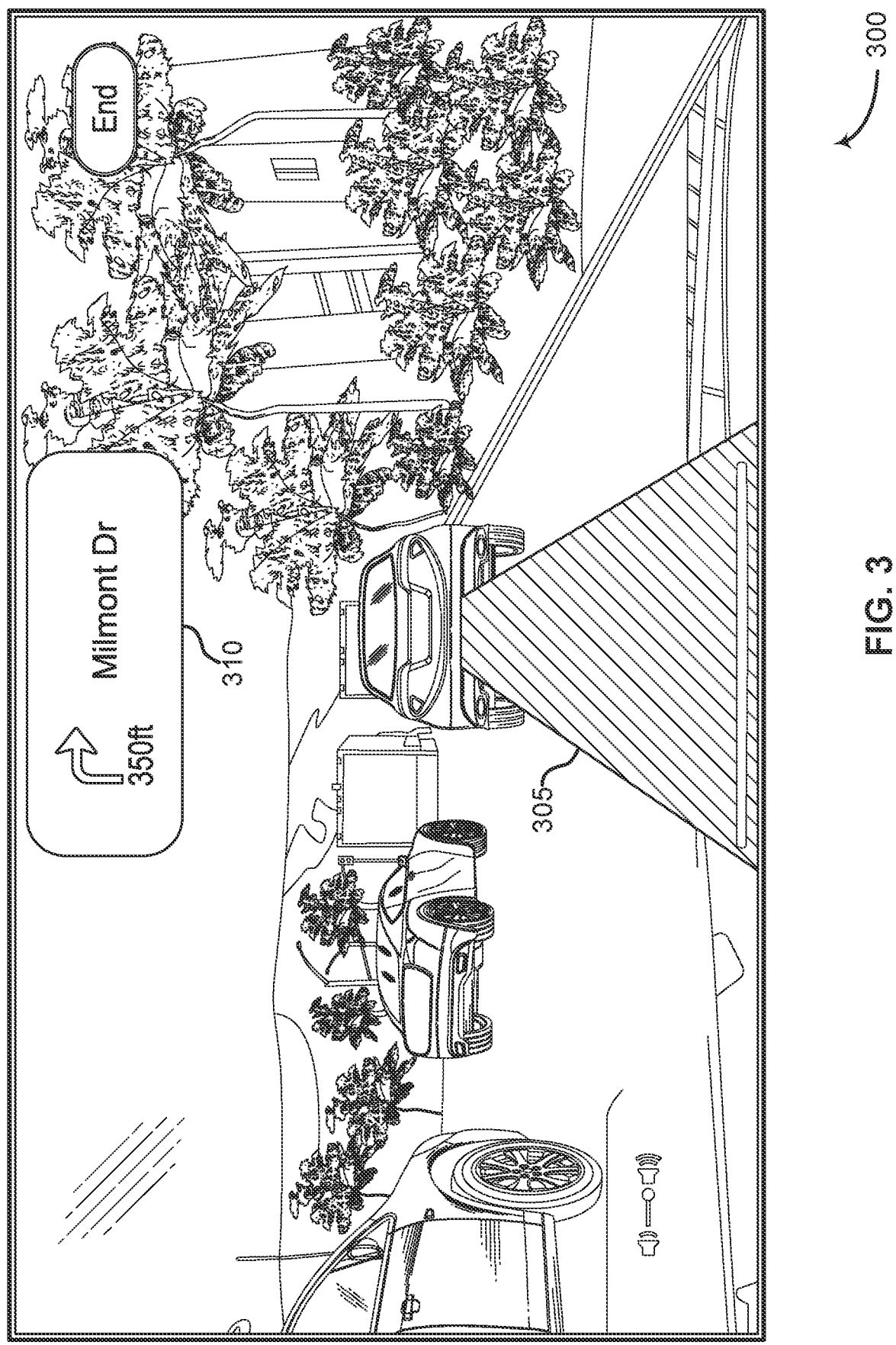
FIGS. 3 through 4 show examples of an Augmented Reality (AR) navigation view without a computer vision-based positioning algorithm in accordance with aspects of the present disclosure.

FIG. 3 shows an example of an AR navigation view 300 without a computer vision-based positioning algorithm in accordance with aspects of the present disclosure. AR navigation view 300 may include route overlay 305 and navigation instruction 310.

In the example shown in AR navigation view 300, a camera is pointed toward the road, and the route overlay 305 appears to hover over the road. The AR navigation view 300 is generated without a computer vision-based positioning algorithm. The route overlay 305 is one form of navigation indication. Without a computer vision-based positioning algorithm, the computing device 105 lacks a way of connecting the route overlay 305 to the live camera scene captured by the camera. It does not know where the road is and so cannot draw the route overlay 305 on the road.

Figure 4:
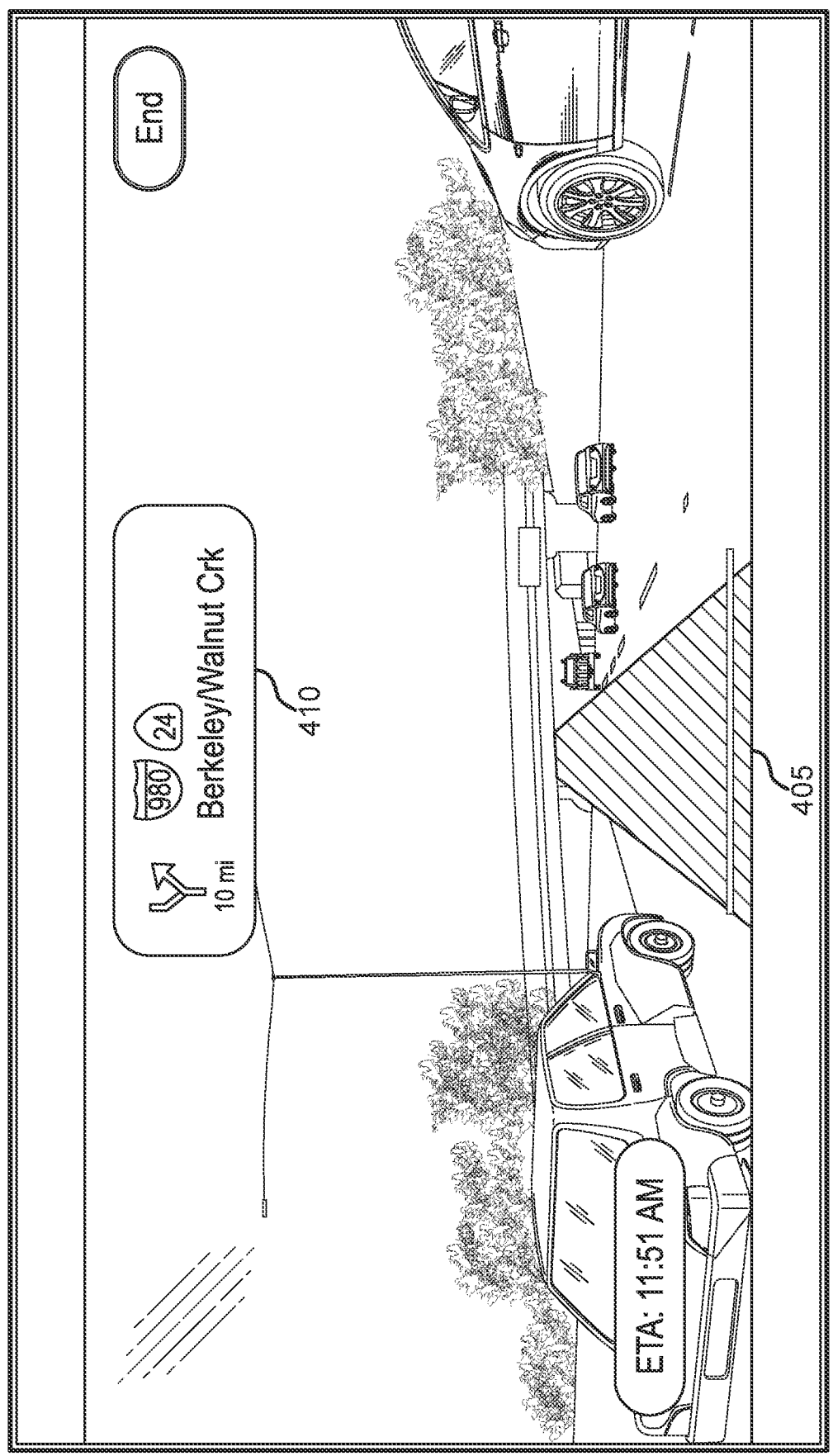

FIG. 4 shows an example of a AR navigation view 400 without a computer vision-based positioning algorithm in accordance with aspects of the present disclosure. AR navigation view 400 may include route overlay 405 and navigation instruction 410. The route overlay 405 is one form of navigation indication.

In the example shown in AR navigation view 400, a camera is pointed in an upward direction, and the route overlay 405 still appears, but it appears offset from the road because the AR navigation view 400 is generated without a computer vision-based positioning algorithm. The computing device 105 has no information about the location of the road and so paints the route overlay 405 in a straight direction that makes it appear to be pointing at the sky.

Figure 5A:
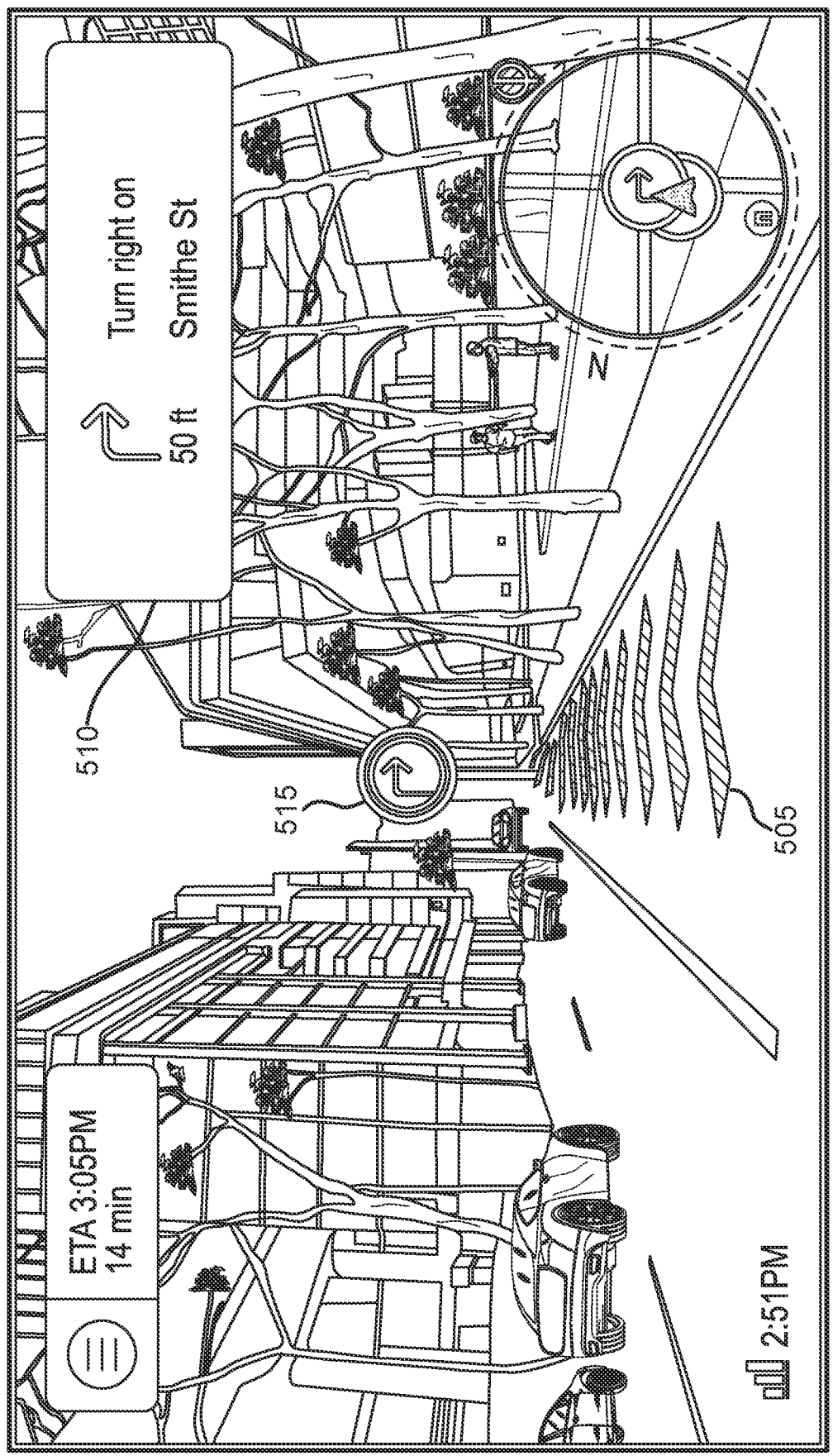
FIGS. 5A-5E shows an example of an AR navigation view with a computer vision-based positioning algorithm in accordance with aspects of the present disclosure.

FIG. 5A shows an example of an AR navigation view 500 with a computer vision-based positioning algorithm in accordance with aspects of the present disclosure. For example, AR navigation view 500 may be generated using Visual Odometry (VO), Visual Inertial Odometry (VIO), or SLAM (Simultaneous Location and Mapping) data. AR navigation view 500 may include route overlay 505, navigation instruction 510, and point of interest 515.

AR navigation view 500 is generated using a computer vision-based positioning system, which may determine the location of landmarks in the scene and enable building a local 3D map. Based on the local 3D map, AR elements, such as the route overlay 505 and point of interest 515, may be positioned in the scene as if they were really in the environment. The route overlay 505 is shown painted on the road, which is enabled through the computer-vision based positioning system.

As illustrated by the point of interest 515, using the computer vision-based positioning system enables an AR navigation system to world-lock AR objects, which means that an AR object may be pinned somewhere specifically in the world, and shows up in the live AR view and can remain there persistently. This may improve the visual appearance of an AR overlay by making objects look as if they were placed in the environment, locked to a specific location of the world.

Figure 5B:
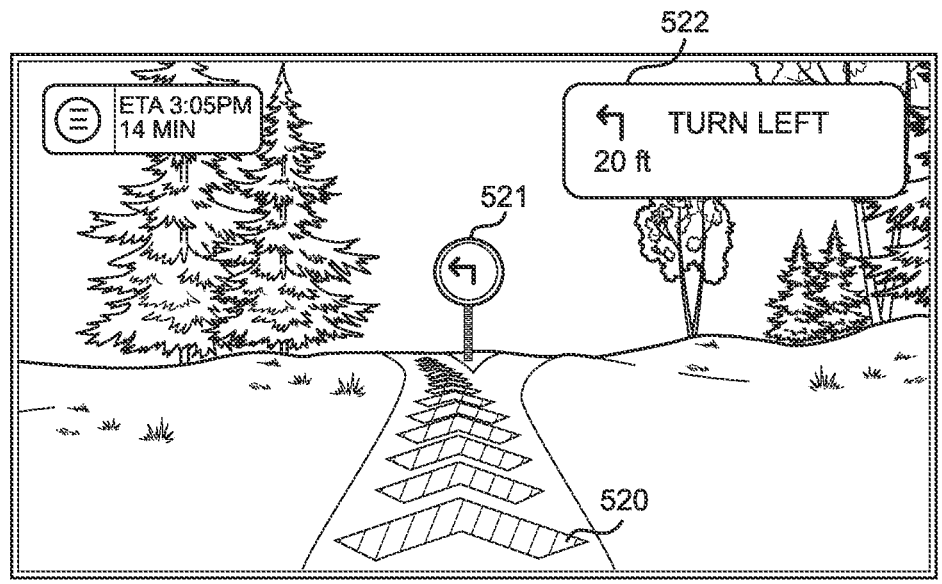

FIG. 5B shows another example of an AR navigation view with a computer vision-based positioning algorithm in accordance with aspects of the present disclosure. For example, AR navigation view may be generated using Visual Odometry (VO), Visual Inertial Odometry (VIO), or SLAM (Simultaneous Location and Mapping) data. AR navigation view may include route overlay 520, navigation instruction 522, and point of interest 521.

The AR navigation instructions may be provided to a user who is walking. Route overlay 520 is displayed on top of a footpath. Point of interest 521 may be a location on the path for a maneuver for the user. Navigation instruction 522 may display instructions to the user to navigate along the route.

Figure 5C:
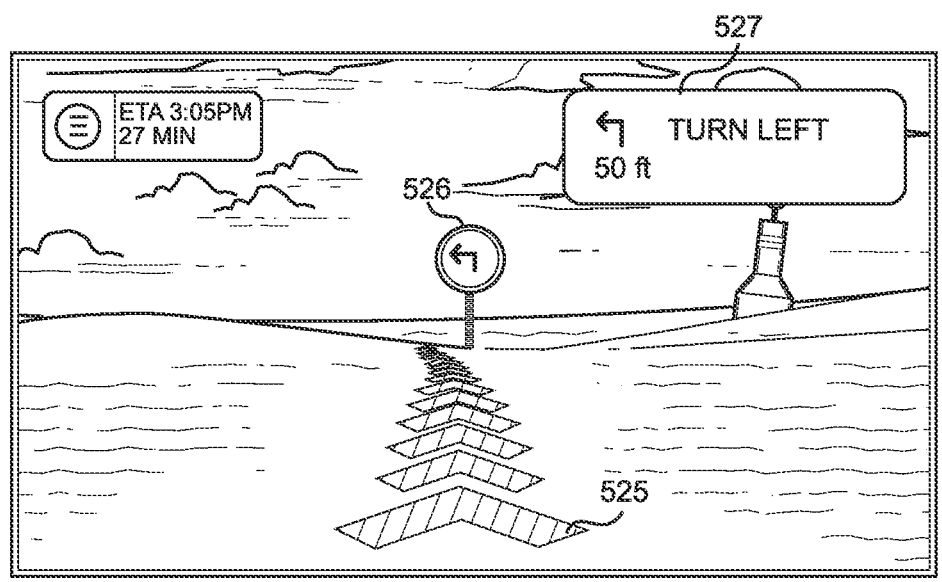

FIG. 5C shows another example of an AR navigation view with a computer vision-based positioning algorithm in accordance with aspects of the present disclosure. For example, AR navigation view may be generated using Visual Odometry (VO), Visual Inertial Odometry (VIO), or SLAM (Simultaneous Location and Mapping) data. AR navigation view may include route overlay 525, navigation instruction 527, and point of interest 526.

The AR navigation instructions may be provided to a user who is operating a watercraft, such as a boat. Route overlay 525 is displayed on top of the surface of the water. Point of interest 526 may be a location on the water for a maneuver for the user. Navigation instruction 527 may display instructions to the user to navigate along the route.

Figure 5D:
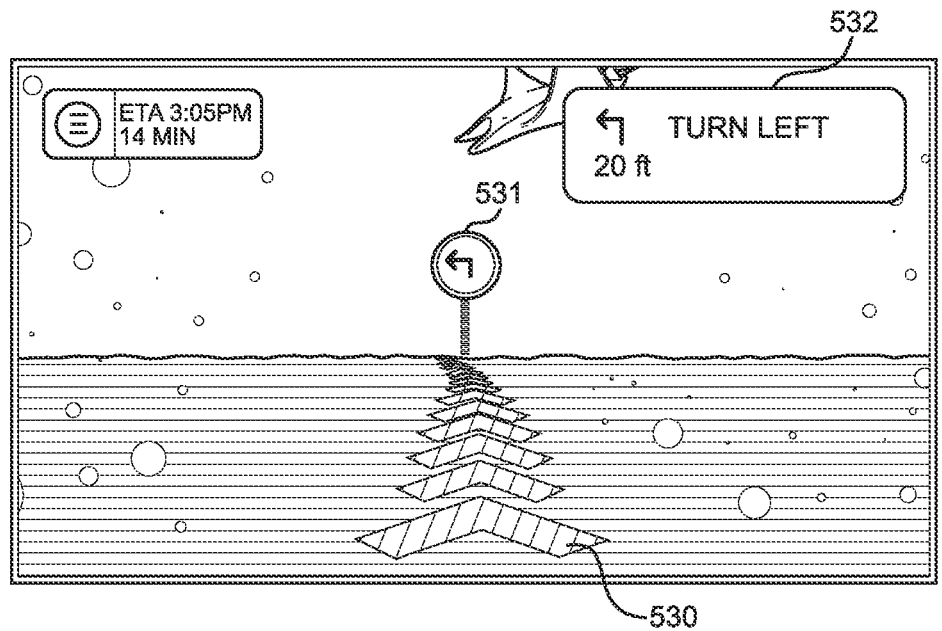

FIG. 5D shows another example of an AR navigation view with a computer vision-based positioning algorithm in accordance with aspects of the present disclosure. For example, AR navigation view may be generated using Visual Odometry (VO), Visual Inertial Odometry (VIO), or SLAM (Simultaneous Location and Mapping) data. AR navigation view may include route overlay 530, navigation instruction 532, and point of interest 531.

The AR navigation instructions may be provided to a user who is operating an underwater craft, such as a submarine. Route overlay 530 is displayed on top of the surface of the seabed. Point of interest 531 may be an underwater location for a maneuver for the user. Navigation instruction 532 may display instructions to the user to navigate along the route.

Figure 5E:
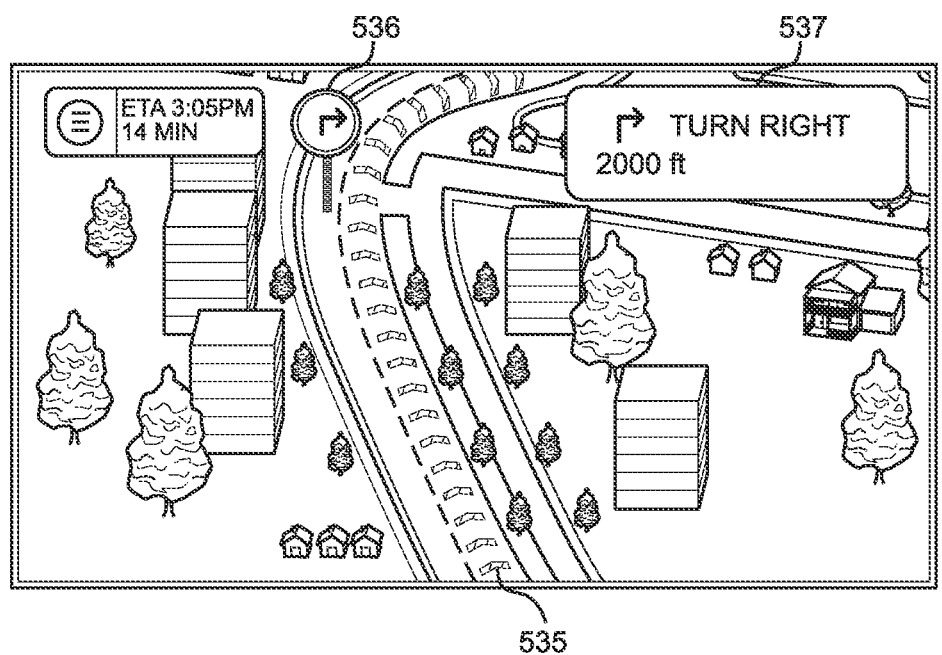

FIG. 5E shows another example of an AR navigation view with a computer vision-based positioning algorithm in accordance with aspects of the present disclosure. For example, AR navigation view may be generated using Visual Odometry (VO), Visual Inertial Odometry (VIO), or SLAM (Simultaneous Location and Mapping) data. AR navigation view may include route overlay 535, navigation instruction 537, and point of interest 536.

The AR navigation instructions may be provided to a user who is operating an aircraft, such as an airplane or helicopter. Route overlay 535 is displayed on top of the surface of the ground. Point of interest 536 may be a location for a maneuver for the user. Navigation instruction 537 may display instructions to the user to navigate along the route.

Figure 6:
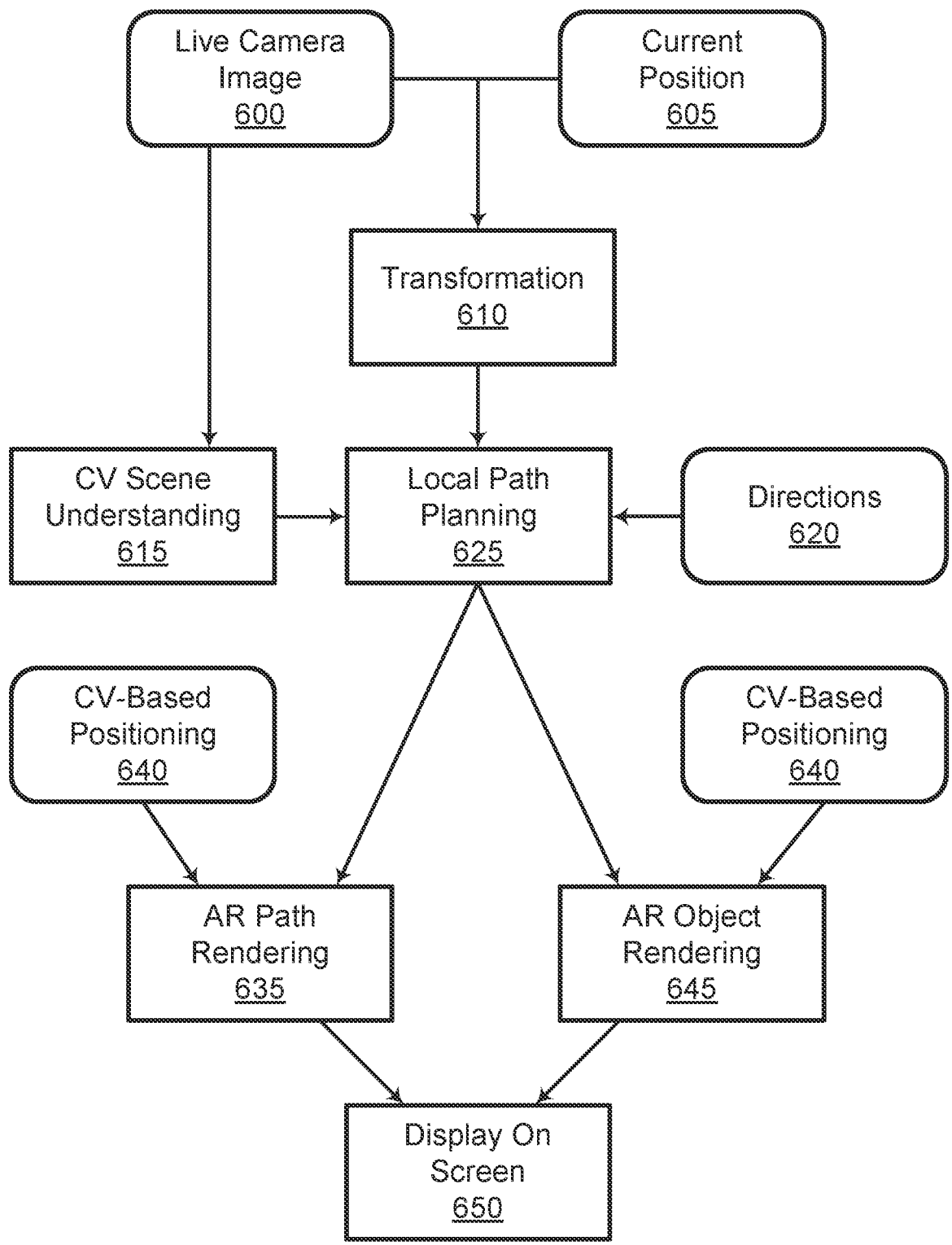
FIG. 6 shows an example of an overview of an AR navigation process in accordance with aspects of the present disclosure.

FIG. 6 shows an example of an overview of an AR navigation process in accordance with aspects of some embodiments. The example shown includes live camera image 600, current position 605, transformation 610, computer vision scene understanding 615, directions 620, local path planning 625, AR path rendering 635, computer vision-based positioning 640, AR object rendering 645, and AR path and object rendering displayed on screen 650.

Live camera image 600 may comprise an image captured from camera 110. Current location 605 may be obtained from location component 250, such as by GPS or GNSS localization. Transformation 110 may be applied by world-to-camera transform component 225 to transform the live camera image 600 to scale and transform it for display on the screen.

Directions 620 may be obtained from navigation component 235. The directions 620 may comprise a series of navigation instructions along a route from a source point to a destination point. Optionally, each navigation instruction may correspond to a waypoint on the route.

Computer vision scene understanding 615 may be performed on the live camera image 600 to enable understanding of the scene, such as by machine learning models. The scene understanding may include lane identification, sidewalk identification, semantic scene and object detection and classification, horizon detection, and so on.

Based on the set of waypoints from directions 620 and the computer vision scene understanding, local path planning 625 may be performed. Local path planning may include planning a path of the vehicle 100 or user around obstacles in the environment such as other objects. It may also include navigating lanes or pathways in the environment, which are at a microscale compared to the waypoints.

After local path planning 625, one or more navigation indications may be generated for display. The navigation indications may help guide the user in pursuing the route. The navigation indications may include, for example, a route overlay that shows where the vehicle 100 should drive or user should walk. The navigation indications may also include a point of interest, such as a maneuver indicator to show where a maneuver should be performed.

Computer vision-based positioning 640 may be used to transform the display of the navigation indications in order to be displayed at a realistic location in the AR overlay. Computer vision-based positioning may include VO, VIO, SLAM, or other algorithms based on computer vision and for understanding the relative position of parts of an image. The computer vision-based positioning 640 may be applied to both route overlays and to points of interest.

AR path rendering 635 may include displaying a route overlay to show the path for the vehicle 100 or user to follow. The AR path rendering 635 may include displaying an AR navigation indication on the ground (e.g., road) as a route overlay. The route overlay may be given the appearance of being painted on the ground (e.g., road) through the use of the computer vision-based positioning 640. Alternatively, it may be placed elsewhere in the scene such as hovering above the ground or road.

AR object rendering 645 may be used to display points of interest in the world. Some points of interest include maneuver indicators. In some embodiments, points of interest may be world-locked, meaning that they are locked to a location in the world. Points of interest may also be locations of interest, such as a destination, waypoint, scenic point of interest, and so on. The location of the point of interest may be displayed by the AR object rendering 645 to be locked to a location in the world through the use of the computer vision-based positioning system 640.

AR Path and Object Rendering Displayed on Screen 650 describes a step in which a route overlay and/or objects (such as points of interest) are displayed on an AR overlay to a user on computing device 105. The AR overlay may be displayed over the live camera image 600.

Figure 7:
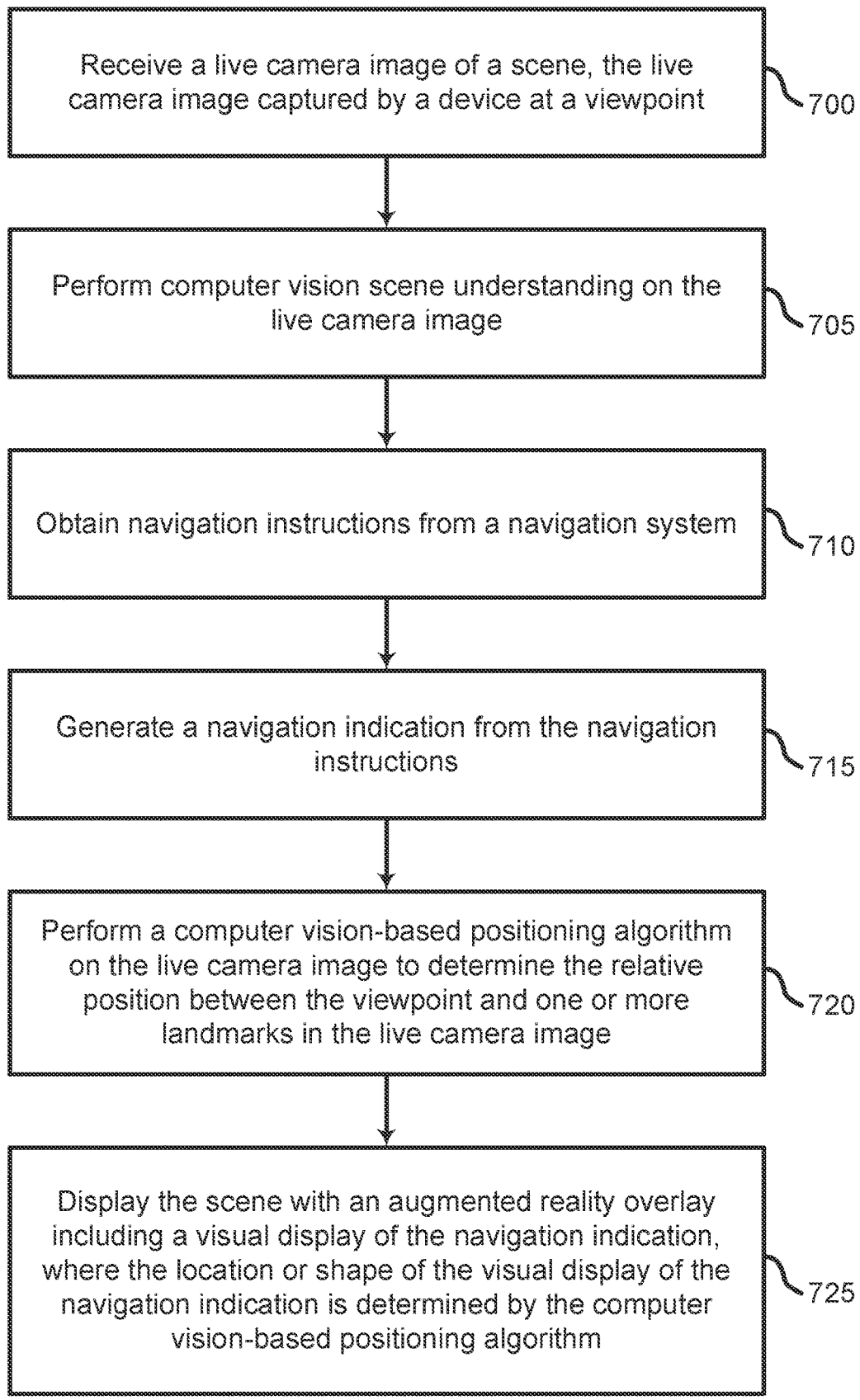
FIG. 7 shows an example of a process for computer vision-based positioning for AR navigation in accordance with aspects of the present disclosure.

FIG. 7 shows an example of a process for computer vision-based positioning for AR navigation that may be performed on computing device 105 in accordance with aspects of the present disclosure.

At step 700, the navigation system receives a live camera image of a scene, the live camera image captured by a device at a viewpoint. The live camera image may be captured by camera 110 of computing device 105.

At step 705, the computing device 105 performs computer vision scene understanding on the live camera image. In some cases, the operations of this step may refer to, or be performed by, a computer vision scene understanding component 230 as described with reference to FIG. 2. For example, the computer vision scene understanding may identify objects and regions of the live camera image (i.e., lanes, semantic objects, horizon line, etc.) as described with respect to the computer vision scene understanding component 230.

At step 710, the computing device 105 obtains navigation instructions from a navigation system. In some cases, the operations of this step may refer to, or be performed by, a navigation component 235 as described with reference to FIG. 2. The navigation instructions may include a set of waypoints from a source point to a destination point.

At step 715, the computing device 105 generates a navigation indication from the navigation instructions. The navigation indication may comprise a visual display such as a route overlay or point of interest. In some embodiments, the navigation indication is a 2D or 3D graphic whose shape and location may later be changed in step 725.

At step 720, the computing device 105 performs a computer vision-based positioning algorithm on the live camera image to determine the relative position between the viewpoint and one or more landmarks in the live camera image. The relative position determine may comprise a distance or direction. In some cases, the operations of this step may refer to, or be performed by, a computer vision-based positioning component 240 as described with reference to FIG. 2.

At step 725, the navigation system displays the scene with an augmented reality overlay including a visual display of the navigation indication, where the location or shape of the visual display of the navigation indication is determined by the computer vision-based positioning algorithm. The location or shape of the visual display of the navigation indication may be transformed from its initial location or shape based on the computer vision-based positioning algorithm.

Figure 8:
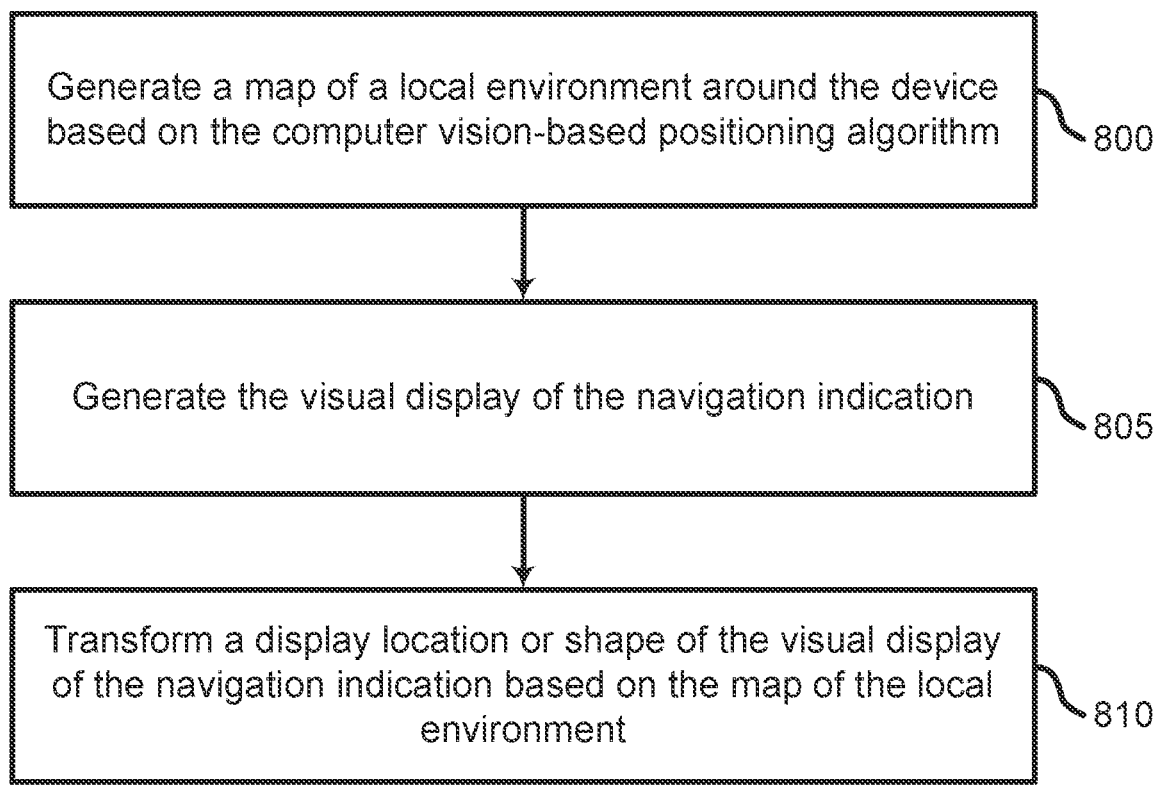
FIG. 8 shows an example of a process for transforming the location or shape of the visual display of the navigation indication based on a map that is generated from the computer-vision based positioning algorithm in accordance with aspects of the present disclosure.

FIG. 8 shows an example of a process for transforming the location or shape of the visual display of the navigation indication based on a map that is generated from the computer-vision based positioning algorithm in accordance with aspects of the present disclosure.

At step 800, the computing device 105 generates a map of a local environment around the device based on the computer vision-based positioning algorithm. In some cases, the operations of this step may refer to, or be performed by, a computer vision-based positioning component 230 as described with reference to FIG. 2. In an embodiment, a computer vision-based positioning algorithm is used to identify landmarks in the live camera image and determine the relative location of the landmarks as compared to the viewpoint (e.g., the device 105). The relative location may include a distance and direction between the viewpoint and the landmark. Based on the distance and direction to the landmarks, a 3D map of the environment corresponding to the live camera image may be generated by the computer vision-based positioning component 230. In some embodiments, a correspondence may be generated between each pixel of the live camera image and a location in the 3D map, including a distance and direction.

At step 805, the computing device 105 generates the visual display of the navigation indication. In some cases, the operations of this step may refer to, or be performed by, an AR component 245 as described with reference to FIG. 2. In an embodiment, the visual display of the navigation indication is a 2D or 3D graphic.

At step 810, the computing device 105 transforms a display location or shape of the visual display of the navigation indication based on the map of the local environment. In some cases, the operations of this step may refer to, or be performed by, an AR component 245 as described with reference to FIG. 2.

Figure 9:
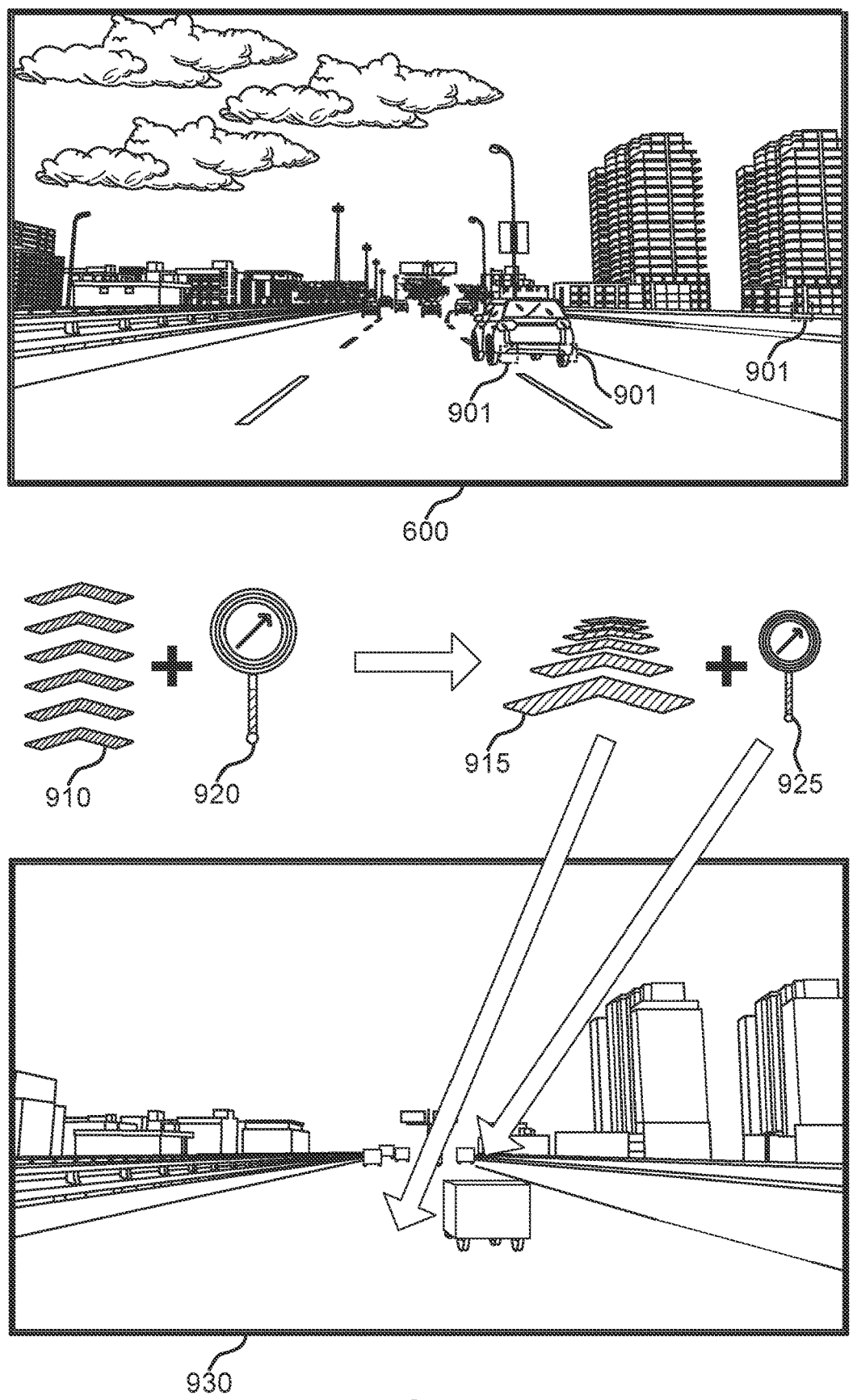
FIG. 9 shows an example of transforming one or more navigation indications in accordance with aspects of the present disclosure.

FIG. 9 illustrates an embodiment of the process shown in FIG. 8. Live camera image 600 is captured from camera 110. The live camera image 600 shows an image of a roadway that is captured while vehicle 100 is traveling. Computer vision-based positioning algorithm 640 is performed on the live camera image 600. Computer vision-based positioning algorithm may be VO, VIO, SLAM, or other algorithms and may include, for example, the methods illustrated in FIGS. 10-12. The computer vision-based positioning algorithm may extract features 901 from the live camera image 600 and either track the features between succeeding frames or match the features to features in succeeding frames. Features may optionally be pixel-level features. Based on the matching of features between frames, the computer vision-based positioning algorithm may estimate motion. Based on the estimated motion, the location (such as distance and direction) of the features from the viewpoint may be determined. As a result, a 3D model 930 may be built of the scene based on the live camera image 600.

Navigation indications 910, 920 may be generated, including route overlay 910 and point of interest 920 (for example, in steps 715 and 1325). The navigation indications may be 2D or 3D graphics that are initially not customized for a particular 3D environment. As a result the computer vision-based positioning, 3D map 930 is generated and the computing device 105 transforms the navigation indications 910, 920 so that they appear as if they are real objects in the environment. Route overlay 910 is transformed to change its shape and size to transformed route overlay 915 so that it appears to be textured on the road. For example, the transformation may be an affine transformation. The transformation may include perspective foreshortening. In this example, the route overlay 910 may be transformed to be wider in the X axis and shorter in the Y axis to make it appear to be laid flat on the road. In other embodiments, a skew may be applied to make it appear that the route overlay 915 is directed or turned to the left or right. Meanwhile, the point of interest 920 may also have its shape and size transformed in the same ways to generate transformed point of interest 920. In this example, the point of interest 920 may be made smaller or foreshortened to appear as if it is in the distance. Moreover, the locations of the transformed route overlay 915 and transformed point of interest 920 may also be selected based on their location in the 3D map 930. The transformed route overlay 915 and transformed point of interest 920 may then be drawn on top of the live camera image 600 at the corresponding X and Y coordinates of the screen based on the locations in the 3D map 930.

In some embodiments, the location for displaying the point of interest 925 is determined by the navigation component 235 identifying the location in the world of the point of interest and the location component 250 identifying the location in the world of the vehicle. The navigation component 235 may identify the location of the point of interest from a digital map. The distance and direction between the vehicle and the point of interest may then be determined. Based on the distance and direction, the point of interest may then be placed at the same distance and direction in the 3D map 930 as they are in the real world. The (X, Y) coordinates of the point overlay 925 on the screen may then be determined by projecting the 3D map 930 on to the display 115. The point of interest 925 may then be displayed on the AR overlay of the live camera view at the (X, Y) coordinates.

Similarly, the direction and distance of a route overlay 915 may determined by the navigation component 235 identifying the location of the route and the location component 250 identifying the location in the world of the vehicle. The navigation component 235 may identify the location of the route from a digital map. The distance and direction between the vehicle and the route may then be determined. Based on the distance and direction, the route may then be textured on to the road at the same distance and direction in the 3D map 930 as it is in the real world. The transformed image of the route overlay 915 may then be determined by projecting the 3D map 930 on to the display 115. The route overlay 915 may then be displayed on the AR overlay of the live camera view.

While the process is illustrated in FIG. 9 using a car on a road, it should be understood that the same process may be used in any of the embodiments including a user 120 walking, a motorcycle 121, a watercraft 122, an underwater craft 123, or an aircraft 124. For example, the same process may be used to generate the AR views in FIGS. 5B, 5C, 5D, and 5E.

Figure 10:
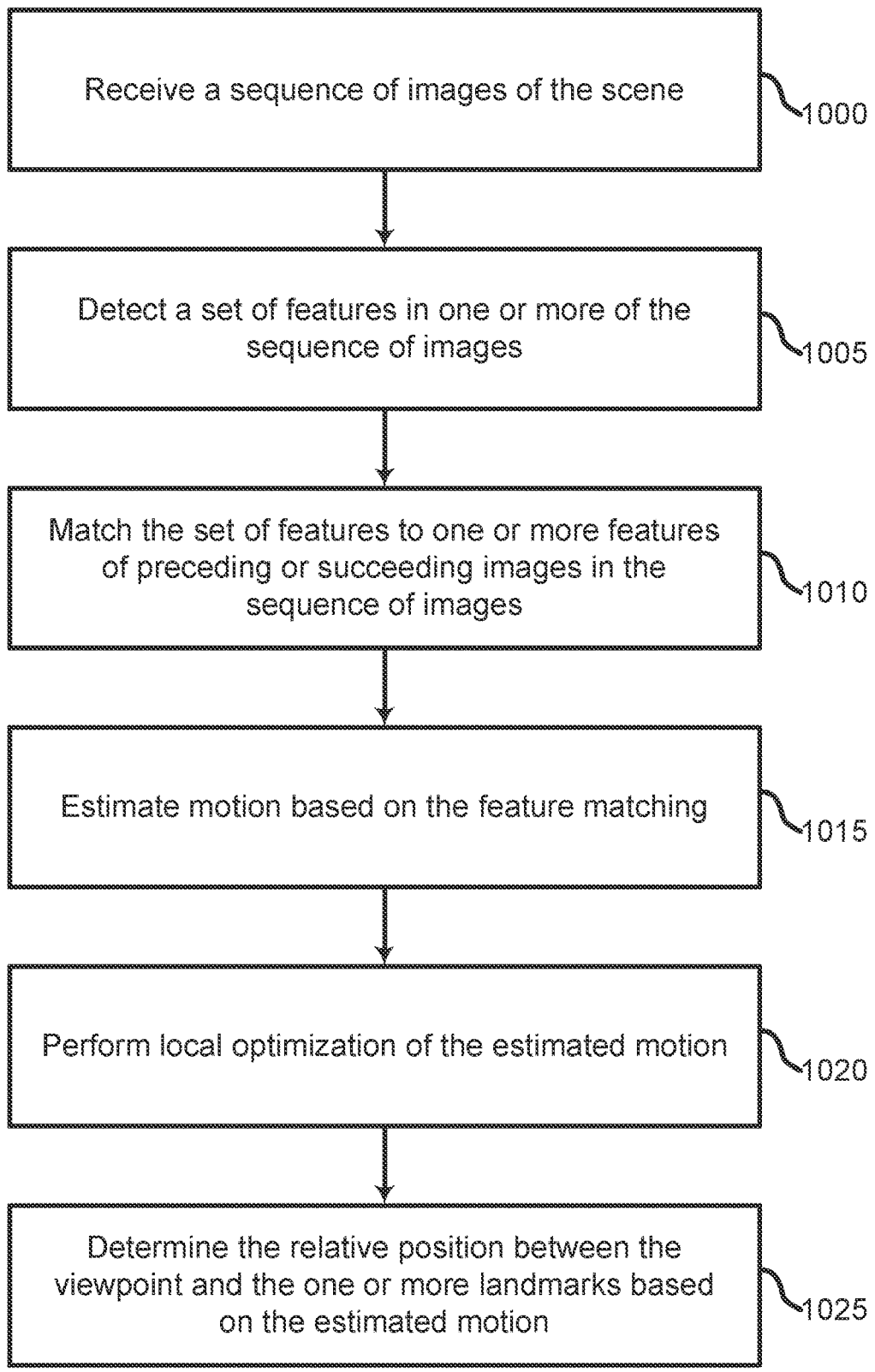
FIG. 10 shows an example of a process for visual odometry in accordance with aspects of the present disclosure.

FIG. 10 shows one embodiment of a computer-implemented method for visual odometry in accordance with aspects of the present disclosure.

At step 1000, the computing device 105 receives a sequence of images of the scene (e.g. road). In some cases, the operations of this step may refer to, or be performed by, a camera 110 as described with reference to FIG. 2.

At step 1005, the computing device 105 detects a set of features in one or more of the sequence of images. Features may be pixel-level features comprises small sets of pixels such as 2×2, 3×3, 4×4, 5×5, 6×6, and so on. Features may be detected by a feature detector and extracted by a feature extractor. Features may comprise a transform performed on the set of pixels, such as a convolution. In some cases, the operations of this step may refer to, or be performed by, a computer vision-based positioning component 230 as described with reference to FIG. 2.

At step 1010, the computing device 105 matches the set of features to one or more features of preceding or succeeding images in the sequence of images. This step may be performed by a feature matching algorithm that identifies features that are similar between the images and therefore likely to correspond to the same feature across images. Feature matching may be performed by a machine learning model such as a neural network. In some cases, the operations of this step may refer to, or be performed by, a computer vision-based positioning component 230 as described with reference to FIG. 2.

At step 1015, the computing device 105 estimates motion based on the feature matching. Motion may be estimated due to the correspondences determined between features in adjacent images in the sequence. Based on the movement of the features between preceding and succeeding images, the motion of the viewpoint may be estimated. In some cases, the operations of this step may refer to, or be performed by, a computer vision-based positioning component 230 as described with reference to FIG. 2.

At step 1020, the computing device 105 performs local optimization of the estimated motion. In some embodiments, local optimization may comprise bundle adjustment. In some cases, the operations of this step may refer to, or be performed by, a computer vision-based positioning component 230 as described with reference to FIG. 2.

At step 1025, the computing device 105 determines the relative position between the viewpoint and the one or more landmarks based on the estimated motion. The landmarks may be features, in some embodiments. The estimated motion of the viewpoint allows modeling how the landmarks would be predicted to move based on their location. By identifying and processing the actual motion of the landmarks in the images, the computing device 105 may determine the locations of the landmarks in the environment. The locations may be defined by X, Y, Z coordinates in 3D space. In some cases, the operations of this step may refer to, or be performed by, a computer vision-based positioning component 230 as described with reference to FIG. 2.

Figure 11:
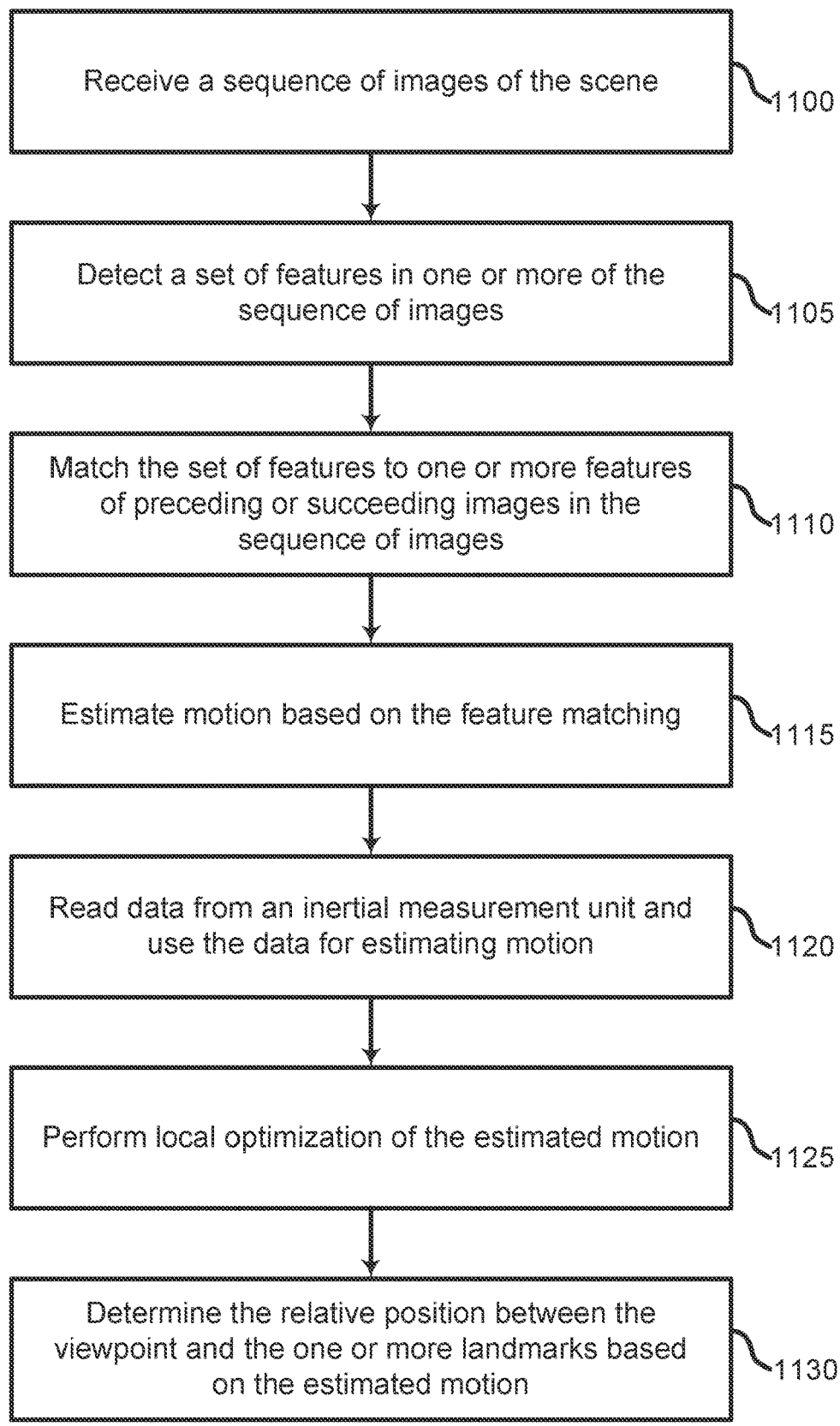
FIG. 11 shows an example of a process for visual inertial odometry in accordance with aspects of the present disclosure.

FIG. 11 shows an example of a computer-implemented method for visual inertial odometry in accordance with aspects of the present disclosure.

The process shown in FIG. 11 is similar to that of FIG. 10, except that FIG. 11 illustrates the use of an inertial measurement unit to further augment the estimation of motion. Specifically, at step 1116, the computing device 105 reads data from an inertial measurement unit and uses the data for estimating motion. In some embodiments, the inertial measurement is used in the local optimization step 1020 for more accurate optimization. The remaining steps of FIG. 11 correspond to the steps of FIG. 10.

Figure 12:
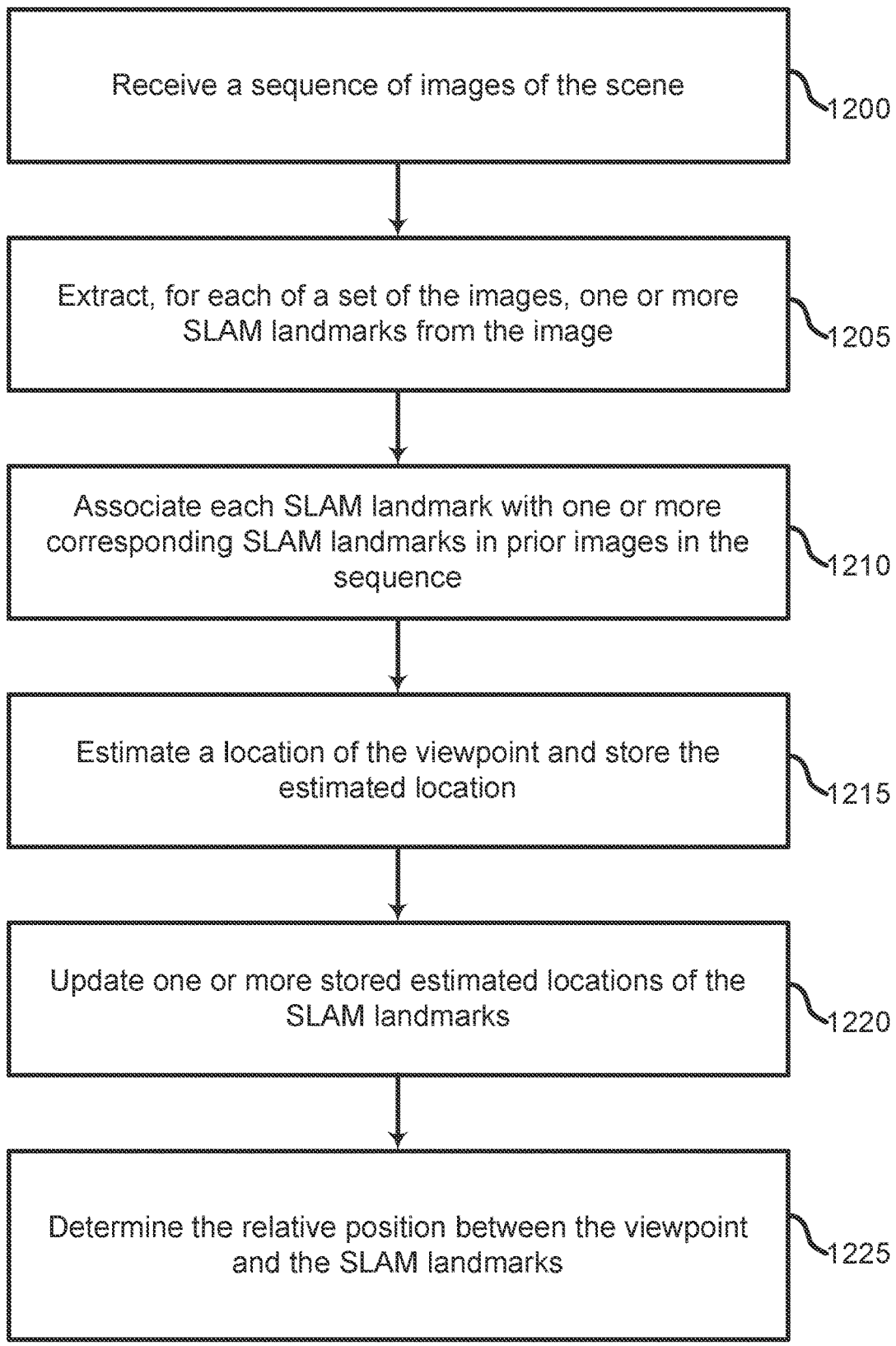
FIG. 12 shows an example of a process for Simultaneous Localization and Mapping (SLAM) in accordance with aspects of the present disclosure.

FIG. 12 shows an example of a computer-implemented method for SLAM in accordance with aspects of the present disclosure. In some embodiments, a SLAM algorithm constructs or updates a map of an unknown environment while simultaneously tracking the agent's location within it. Since both the map and the agent's location are initially unknown, the process may iteratively estimate one and then the other to refine the two in tandem until convergence.

At step 1200, the computing device 105 receives a sequence of images of the scene (e.g., road). In some cases, the operations of this step may refer to, or be performed by, a camera 110 as described with reference to FIG. 2.

At step 1205, the computing device 105 extracts, for each of a set of the images, one or more SLAM landmarks from the image. SLAM landmarks may be pixel-level features comprises small sets of pixels such as 2×2, 3×3, 4×4, 5×5, 6×6, and so on. SLAM landmarks may be detected by a feature detector and extracted by a feature extractor. SLAM landmarks may comprise a transform performed on the set of pixels, such as a convolution. In some cases, the operations of this step may refer to, or be performed by, a computer vision-based positioning component 230 as described with reference to FIG. 2.

At step 1210, the computing device 105 associates each SLAM landmark with one or more corresponding SLAM landmarks in prior images in the sequence. This step may be performed by a landmark matching algorithm that identifies SLAM landmarks that are similar between the images and therefore likely to correspond to the same SLAM landmark across images. Landmark matching may be performed by a machine learning model such as a neural network. In some cases, the operations of this step may refer to, or be performed by, a computer vision-based positioning component 230 as described with reference to FIG. 2.

At step 1215, the computing device 105 estimates a location of the viewpoint and stores the estimated location. In some cases, the operations of this step may refer to, or be performed by, a computer vision-based positioning component 230 as described with reference to FIG. 2.

At step 1220, the computing device 105 updates one or more stored estimated locations of the SLAM landmarks. In some cases, the operations of this step may refer to, or be performed by, a computer vision-based positioning component 230 as described with reference to FIG. 2.

At step 1225, the computing device 105 determines the relative position between the viewpoint and the SLAM landmarks. In some embodiments, the SLAM landmarks may be the one or more landmarks determined in the live camera image in step 720. In some cases, the operations of this step may refer to, or be performed by, a computer vision-based positioning component 230 as described with reference to FIG. 2.

Figure 13:
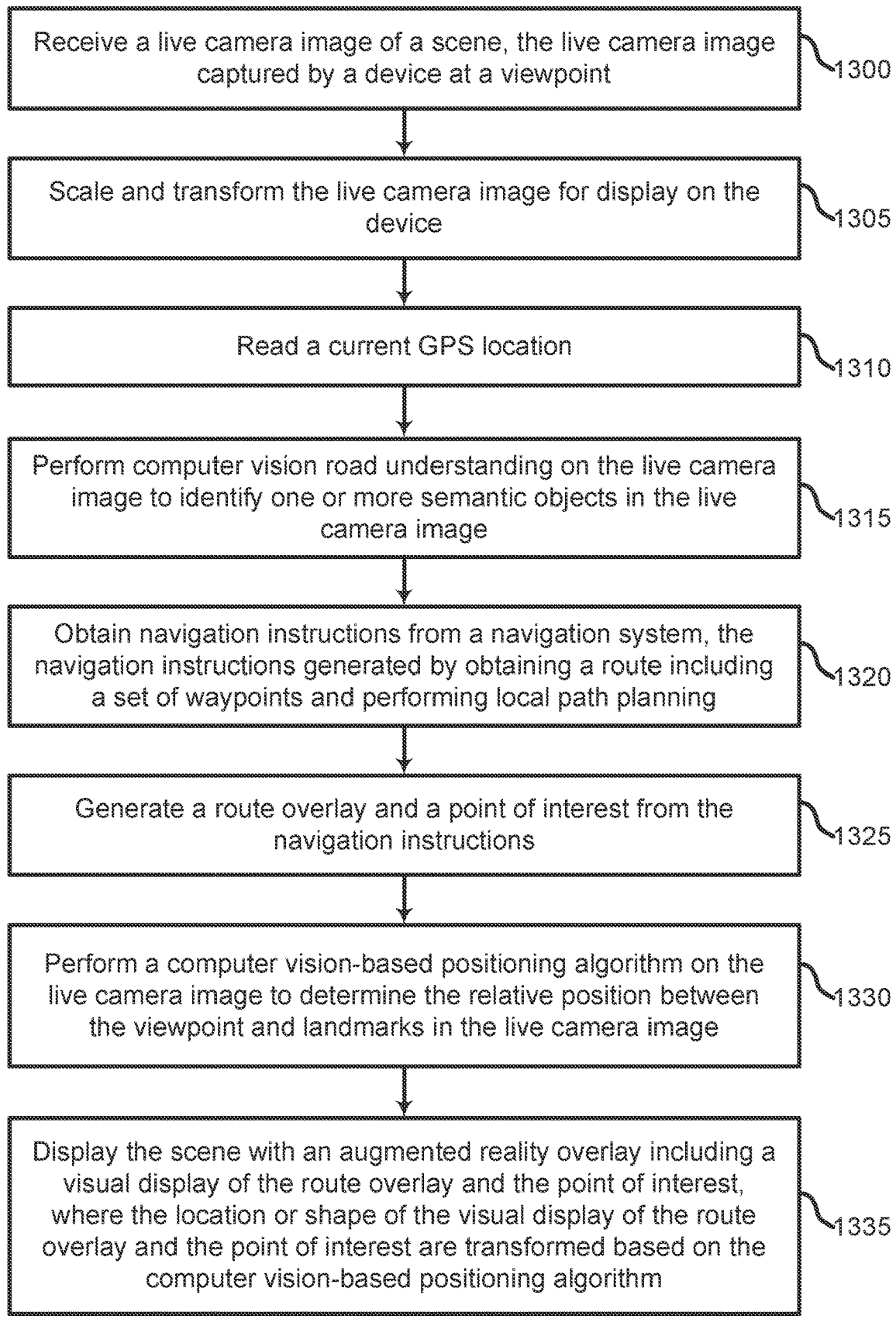
FIG. 13 shows an example of a process for computer vision based positioning for AR navigation in accordance with aspects of the present disclosure.

FIG. 13 shows an example of a computer-implemented method for computer vision-based positioning for AR navigation in accordance with aspects of the present disclosure.

At step 1300, the computing device 105 receives a live camera image of a scene (e.g., road), the live camera image captured by a device at a viewpoint. In some cases, the operations of this step may refer to, or be performed by, a camera 110 as described with reference to FIG. 2.

At step 1305, the computing device 105 scales and transforms the live camera image for display on the device. In some cases, the operations of this step may refer to, or be performed by, world-to-camera transform component 225 as described with reference to FIG. 2.

At step 1310, the computing device 105 reads, by the device, a current GPS location. In some cases, the operations of this step may refer to, or be performed by, a location component 250 as described with reference to FIG. 2.

At step 1315, the computing device 105 performs computer vision scene understanding on the live camera image to identify one or more semantic objects in the live camera image. In some cases, the operations of this step may refer to, or be performed by, a computer vision scene understanding component 230 as described with reference to FIG. 2.

At step 1320, the computing device 105 obtains navigation instructions from a navigation system, the navigation instructions generated by obtaining a route including a set of waypoints and performing local path planning. In some cases, the operations of this step may refer to, or be performed by, a navigation component 235 as described with reference to FIG. 2.

At step 1325, the computing device 105 generates a route overlay and a point of interest from the navigation instructions. In some cases, the operations of this step may refer to, or be performed by, an AR component 245 as described with reference to FIG. 2.

At step 1330, the computing device 105 performs a computer vision-based positioning algorithm on the live camera image to determine the relative position between the viewpoint and one or more landmarks in the live camera image. In some cases, the operations of this step may refer to, or be performed by, a computer vision-based positioning component 240 as described with reference to FIG. 2.

At step 1335, the computing device 105 displays the scene with an augmented reality overlay including a visual display of the route overlay and the point of interest, where the location or shape of the visual display of the route overlay and the point of interest are transformed based on the computer vision-based positioning algorithm. In some cases, the operations of this step may refer to, or be performed by, an AR component 245 as described with reference to FIG. 2.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact disc, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method for computer vision based positioning for Augmented Reality (AR) navigation, the method comprising:
   receiving a live camera image of a scene, the live camera image captured by a device;
   obtaining navigation instructions from a navigation system;
   generating a route overlay from the navigation instructions;
   feature matching a plurality of features in successive frames of the live camera image using a machine learning model;
   generating a 3D model of a local environment around the device based on a position of the device as determined by the feature matching, wherein the 3D model comprises a ground plane corresponding to and parallel to ground in the local environment of the device;
   determining a position of the route overlay in the 3D model based on location data from the navigation system and the 3D model;
   generating a visual display of the route overlay in the determined position of the route overlay in the 3D model;
   transforming the shape and size of the visual display of the route overlay such that the transformed visual display appears textured on a surface of the 3D model of the local environment, wherein the transformation further comprises projecting the visual display of the route overlay onto the ground plane in the 3D model and perspective foreshortening of the visual display of the route overlay relative to position of the device; and
   displaying the scene with an augmented reality overlay comprising the transformed visual display of the route overlay appearing textured on a surface of the scene, wherein the displaying comprises drawing the transformed visual display on top of the live camera image of the scene at corresponding X and Y coordinates of a screen of the device, based on location of the transformed visual display in the 3D model.

2. The method of claim 1, wherein:
   the route overlay is displayed to appear on top of the ground.

3. The method of claim 1, wherein:
the route overlay is a world-locked point of interest.

4. The method of claim 1, further comprising:
identifying one or more semantic objects in the live camera image.

5. The method of claim 1, wherein the position of the device is determined via visual odometry.

6. The method of claim 5, further comprising:
receiving the successive frames of the live camera image;
detecting the plurality of features in one or more of the successive frames; and
performing local optimization of estimated motion.

7. The method of claim 1, wherein the position of the device is determined via visual inertial odometry.

8. The method of claim 7, further comprising:
receiving the successive frames of the live camera image;
detecting the plurality of features in one or more of the successive frames;
reading data from an inertial measurement unit and using the data for computing an estimated motion of the device; and
performing local optimization of the estimated motion of the device.

9. The method of claim 1, wherein the position of the device is determined via Simultaneous Localization and Mapping (SLAM).

10. The method of claim 9, further comprising:
receiving the successive frames of the live camera image;
extracting, for each of the successive frames, one or more SLAM landmarks from the frame;
associating each SLAM landmark with one or more corresponding SLAM landmarks in prior frames of the live camera image; and
determining one or more estimated locations of the SLAM landmarks,
wherein transforming the shape and size of the visual display of the route overlay comprises determining the relative position between a viewpoint of the device and the SLAM landmarks.

11. A non-transitory computer-readable medium containing instructions for computer vision based positioning for Augmented Reality (AR) navigation, the method comprising:
instructions for receiving a live camera image of a scene, the live camera image captured by a device;
instructions for obtaining navigation instructions from a navigation system;
instructions for generating a route overlay from the navigation instructions;
instructions for feature matching a plurality of features in successive frames of the live camera image using a machine learning model;
instructions for generating a 3D model of a local environment around the device based on a position of the device as determined by the feature matching, wherein the 3D model comprises a ground plane corresponding to and parallel to ground in the local environment of the device;
determining a position of the route overlay in the 3D model based on location data from the navigation system and the 3D model;
instructions for generating a visual display of the route overlay in the determined position of the route overlay in the 3D model;
instructions for transforming the shape and size of the visual display of the route overlay such that the transformed visual display appears textured on a surface of the 3D model of the local environment, wherein the transformation further comprises projecting the visual display of the route overlay onto the ground plane in the 3D model and perspective foreshortening of the visual display of the route overlay relative to position of the device; and
instructions for displaying the scene with an augmented reality overlay comprising the transformed visual display of the route overlay appearing textured on a surface of the scene, wherein the displaying comprises drawing the transformed visual display on top of the live camera image of the scene at corresponding X and Y coordinates of a screen of the device, based on location of the transformed visual display in the 3D model.

12. The non-transitory computer-readable medium of claim 11, wherein:
the route overlay is displayed to appear on top of the ground.

13. The non-transitory computer-readable medium of claim 11, wherein:
the route overlay is a world-locked point of interest.

14. The non-transitory computer-readable medium of claim 11, further comprising:
instructions for identifying one or more semantic objects in the live camera image.

15. The non-transitory computer-readable medium of claim 11, wherein the position of the device is determined via visual odometry.

16. The non-transitory computer-readable medium of claim 15, further comprising:
instructions for receiving the successive frames of the live camera image;
instructions for detecting the plurality of features in one or more of the successive frames; and
instructions for performing local optimization of estimated motion.

17. The non-transitory computer-readable medium of claim 11, wherein the position of the device is determined via visual inertial odometry.

18. The non-transitory computer-readable medium of claim 17, further comprising:
instructions for receiving the successive frames of the live camera image;
instructions for detecting the plurality of features in one or more of the successive frames;
instructions for reading data from an inertial measurement unit and using the data for computing an estimated motion of the device; and
instructions for performing local optimization of the estimated motion of the device.

19. The non-transitory computer-readable medium of claim 11, wherein the position of the device is determined via Simultaneous Localization and Mapping (SLAM).

20. The non-transitory computer-readable medium of claim 19, further comprising:
instructions for receiving the successive frames of the live camera image;
instructions for extracting, for each of the successive frames, one or more SLAM landmarks from the frame;
instructions for associating each SLAM landmark with one or more corresponding SLAM landmarks in prior frames of the live camera image; and
instructions for determining one or more estimated locations of the SLAM landmarks, wherein transforming the shape and size of the visual display of the route overlay comprises determining the relative position between a viewpoint of the device and the SLAM landmarks.

\* \* \* \* \*